(12) United States Patent
Koguchi

(10) Patent No.: US 6,243,190 B1
(45) Date of Patent: Jun. 5, 2001

(54) LIGHT SCANNING APPARATUS

(75) Inventor: Hideyuki Koguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/338,541

(22) Filed: Jun. 23, 1999

(30) Foreign Application Priority Data

Jun. 24, 1998 (JP) .................................................. 10-177822

(51) Int. Cl.[7] .................................................. G02B 26/08
(52) U.S. Cl. ......................... 359/226; 359/198; 359/216; 347/260; 347/261; 399/123
(58) Field of Search ..................................... 359/196–226; 347/243, 241, 256–261; 250/234–236; 399/123

(56) References Cited

U.S. PATENT DOCUMENTS 4,329,012 * 5/1982 Minoura et al. ..................... 359/202

* cited by examiner

Primary Examiner—James Phan
(74) Attorney, Agent, or Firm—Sughrue, Mion, Zinn, Macpeak & Seas, PLLC

(57) ABSTRACT

A light scanning apparatus includes a deflector for deflecting a light beam emitted from a laser. A rotating reflector is provided in the deflector, and a reflecting surface is formed on the rotating reflector by cutting away a portion of the rotating reflector diagonally with respect to a plane perpendicular to the axis thereof. The light scanning apparatus further includes a control device for controlling a stopping position of the rotating reflector such that the rotating reflector stops rotating in a state in which the reflecting surface faces a predetermined direction. A magnet, an electromagnet, or a gear mechanism may be used as the control device.

5 Claims, 14 Drawing Sheets

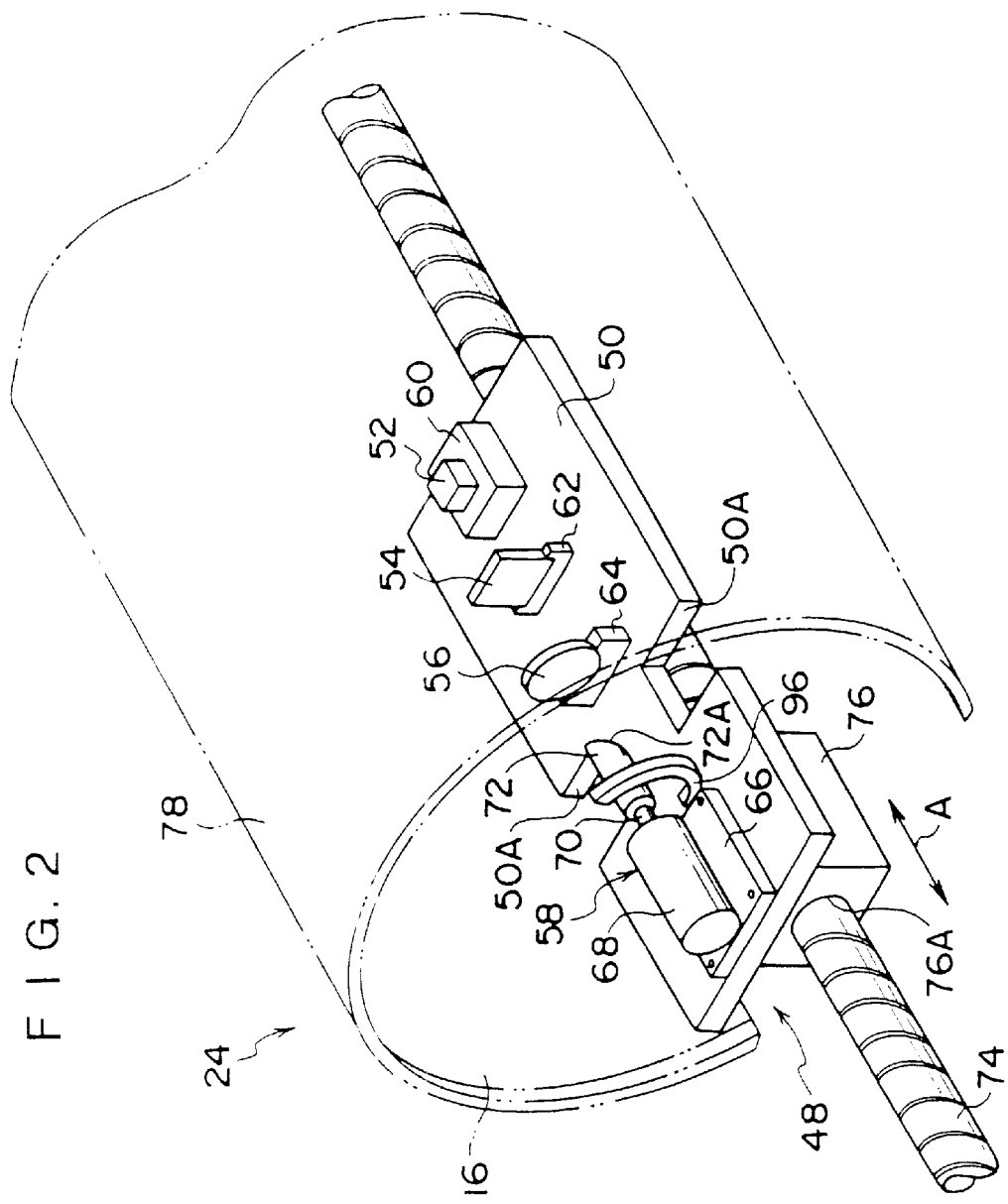

F I G. 3A
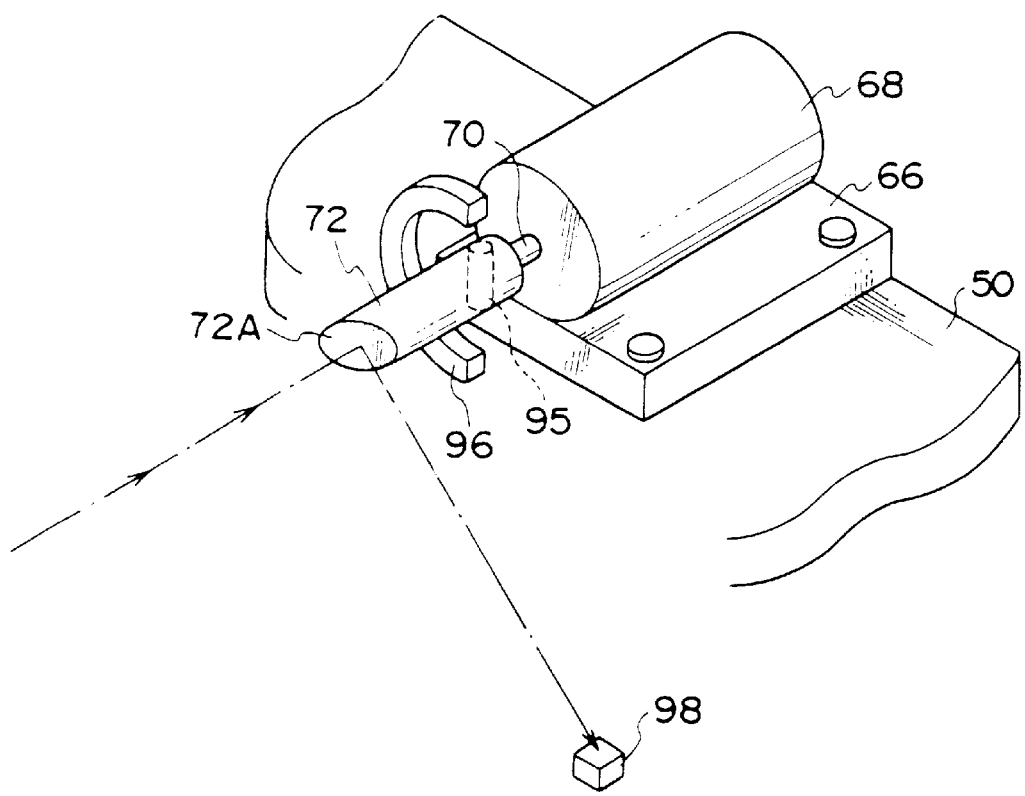
F I G. 3B
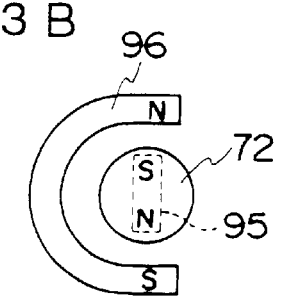

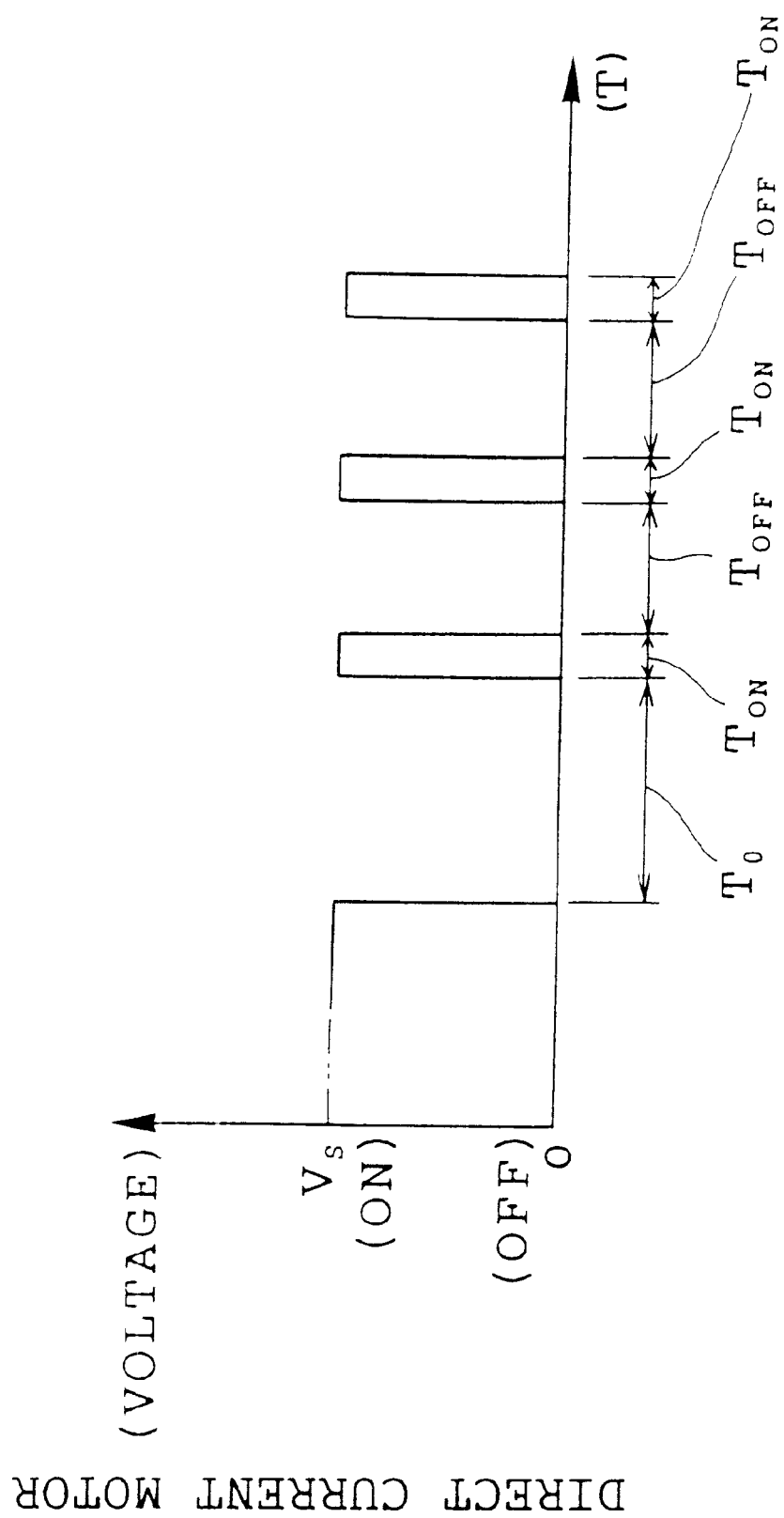

F I G. 1 2
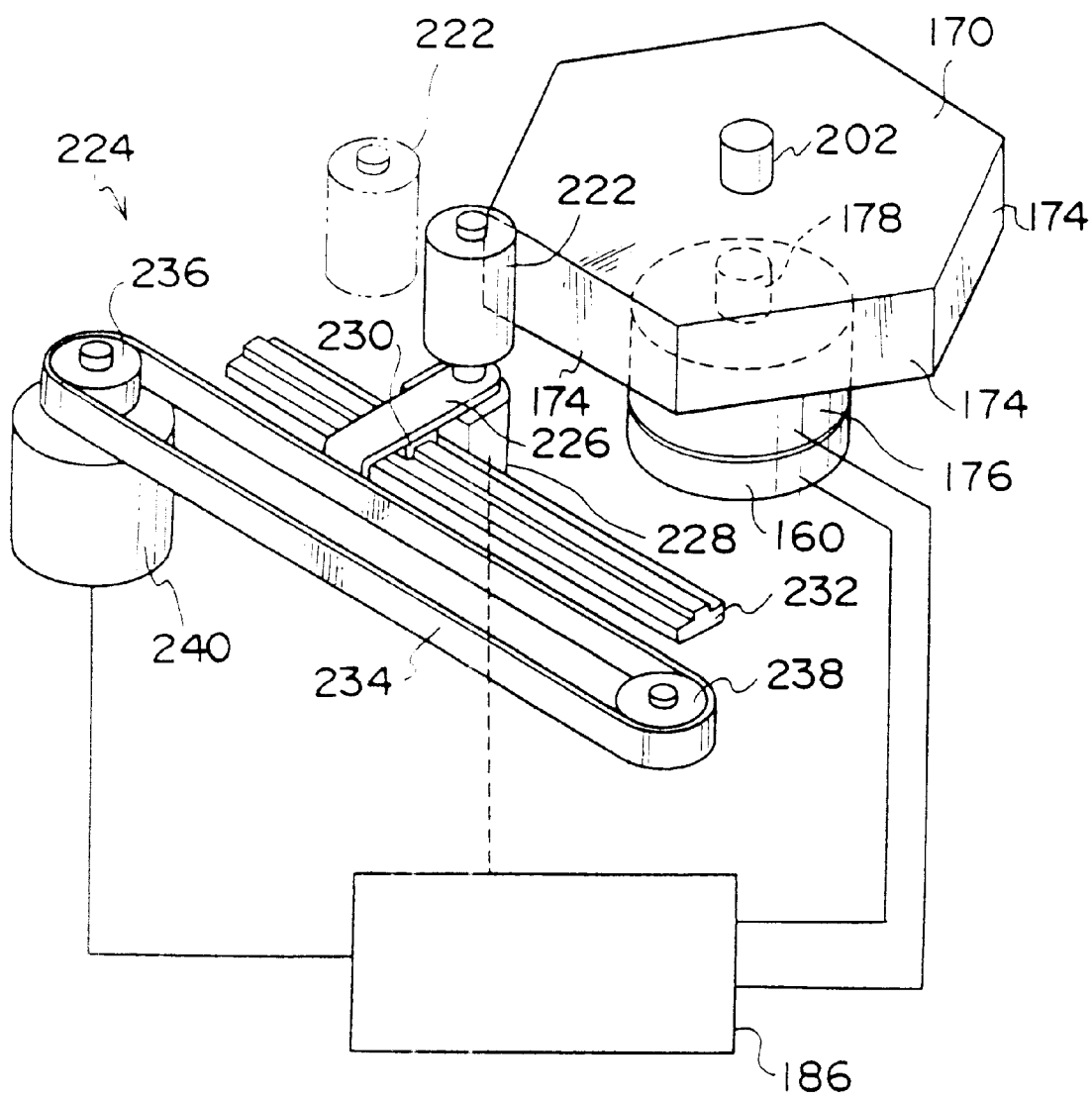

F I G. 1 3
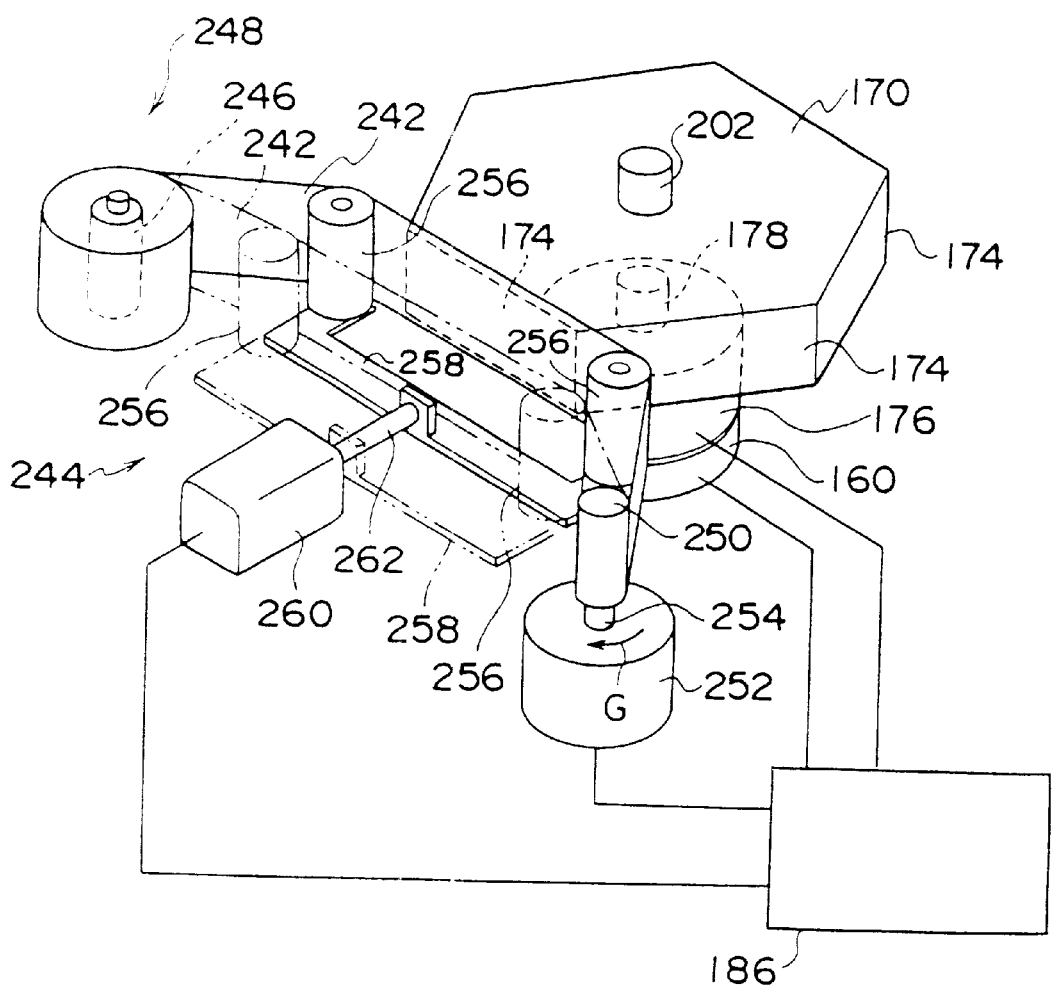

LIGHT SCANNING APPARATUS

BACKGROUND OF THE INVENTION

1. Field of the Invention

The present invention relates to a light deflecting apparatus, and more precisely, to a light scanning apparatus which scans a recording medium by reflecting a light beam incident on a reflecting surface toward an exposure surface of the recording medium by rotating a rotating reflector around the rotation axis thereof, wherein the rotating reflector may be a single surface mirror having a reflecting surface formed diagonally to a plane perpendicular to the rotating axis of the reflector, or a polygon mirror on which multiple reflecting surfaces are provided in a regular polygonal form centered around the rotation axis.

2. Description of the Related Art

An image forming device generally comprises an image exposure device which scans a recording medium such as a photosensitive material by a light beam emitted from a light source, and an image processing device which carries out developing processing and the like on the recording medium on which an image has been recorded by the image exposure device.

An exposure unit is provided in the image exposure device. The exposure unit comprises a light scanning apparatus, which includes plural optical members such as a lens that transforms a diffused light beam emitted from the light source into parallel rays, and a deflector, which deflects the parallel rays. There are drum type exposure units and inner spinner type exposure units. In the drum type exposure unit, a light scanning apparatus is provided at a radial direction outer side of a cylindrical drum, and a recording medium is scanned by a light beam from the exterior of the drum. In the inner spinner type exposure unit, a light scanning apparatus is provided near the center of a circular arc-shaped drum, and a recording medium is scanned by a light beam from the interior of the drum. The inner spinner type exposure unit will be focused on and described herein.

As shown in FIG. 14A, a light scanning apparatus 102 generally includes a laser 106 as a light source and a plurality of optical members mounted on a base 104. On the base 104, a collimator lens 108, a first deflecting mirror 110, a modulator 112, a second deflecting mirror 114, a beam diameter and beam shape correcting lens system 116, a prism mirror 118, and a deflector (referred to as a "spinner" hereafter) 120 are provided in that order in the direction of travel of a light beam emitted from the laser 106. The spinner 120 is rotatable, and the surface thereof facing the light beam travel direction is cut away diagonally so as to form a reflecting surface 120A.

Moreover, as shown in FIG. 14B, a circular arc-shaped drum 122, which is coaxial with the rotation center of the spinner 120, is provided in an exposure unit 100. Furthermore, a guide member 132, which guides the conveying of a recording medium 128 such as a photosensitive material along the circular arc of the drum 122, is provided. The recording medium 128 is loaded into a recording medium supplying section 124 provided underneath the light scanning apparatus 102, and is carried through between the drum 122 and the guide member 132 by rollers 130, so as to be set on the outer peripheral surface of the drum 122. Subsequently, the laser 106 emits a light beam, and the recording medium 128 is scanned by the light beam deflected by the plural optical members and by the rotation of the rotating spinner 120. The recording medium 128 scanned by the light beam is then taken-up in a recording medium take-up section 126 provided beneath the light scanning apparatus 102.

Furthermore, in an exposure unit utilizing a rotating reflector such as a polygon mirror provided with plural reflecting surfaces, the light beam is illuminated onto the rotating reflecting surfaces, and the light beam reflected by the reflecting surfaces scans the recording medium.

A D.C. motor may be used as a driving means to rotate the spinner and polygon mirror, and the supply of electrical power to the motor is stopped when the rotation of the spinner or the polygon mirror is to be stopped. Accordingly, the reflecting surfaces of the spinner or the polygon mirror will face arbitrary directions when the rotation of the spinner or the polygon mirror stops.

In the exposure unit provided with the spinner or the polygon mirror, a start of scan sensor (SOS sensor) is provided at a certain position. At the light scanning apparatus, the timing for the start of the writing of images which are to be recorded on the recording medium is set on the basis of the light beam reflected by the reflecting surface of the rotating reflector and detected by the SOS sensor.

If dust or the like adheres to the reflecting surface, the reflectance of the rotating reflector such as the spinner or the polygon mirror will be degraded. Therefore, the reflecting surface of the rotating reflector are cleaned regularly in the light scanning apparatus. Such automatic cleaning can be realized by providing, for example, a blower nozzle so that an air nozzle thereof substantially opposes the reflecting surface 120A of the spinner 120, and by causing the blower nozzle to jet out air to blow off the dust or the like adhering to the reflecting surface 120A.

However, if the reflecting surface faces an arbitrary direction instead of a certain direction when the rotating reflector stops rotating, the air jetted out from the blower nozzle may not hit the reflecting surface depending on the stopping position of the reflecting surface, so that the air may not be able to blow off the dust or the like adhering to the reflecting surface even though the blower nozzle is provided to clean the reflecting surface.

In another method of automatically cleaning the reflector surface, plural blower nozzles are provided in a ring-shaped arrangement. This method allows dust or the like adhering to the reflecting surface 120A to be blown off and the reflecting surface 120A to be cleaned regardless of what position the reflecting surface 120A of the spinner 120 faces when the spinner 120 stops. However, there has been a problem with this method in that utilization of plural nozzles complicates the overall structure of the light scanning apparatus while increasing the manufacturing cost thereof.

Thus, methods for preventing dust, dirt, or the like from being adhering easily to a reflecting surface in a light scanning apparatus have been studied.

For example, there is a spinner provided with a transparent glass cover covering the reflecting surface for preventing dust or dirt from being adhering thereto. However, such a spinner is expensive. Moreover, since the glass cover cannot completely prevent dust or dirt from being adhering to the reflecting surface, when cleaning is needed, the glass cover gets in the way of cleaning.

Moreover, in order to make it more difficult for the reflecting surface to become dirty, many methods have been contemplated such as creating a decompressed or vacuum state around the spinner or the polygon mirror, or providing a dustproofing filter. However, these methods are expensive, and cannot reliably prevent dirt from adhering to the reflecting surface.

As a means for detecting dirt on the reflecting surface, there is a method for measuring the light amount of the light beam reflected by the reflecting surface by utilizing a light amount sensor. In this case, since it is difficult to have the rotating reflector to stop in a position facing a certain direction, the light amount measurement must be carried out by synchronizing the timing when the light beam reflected by the rotating reflecting surface is illuminated onto the light amount sensor with a detected result by the SOS sensor.

Since the light beam is passed at a high speed over the light amount sensor in such light amount measuring methods, a light amount sensor or an amplifier capable of high-speed responding is required in order to improve the detecting accuracy. However, since such a sensor or amplifier capable of high-speed responding is expensive, the manufacturing cost of the light scanning apparatus increases. Moreover, there is another problem in that the detecting accuracy might deteriorate since the light amount of the light beam is detected while the spinner 120 is rotating.

Furthermore, there is yet another problem in that light amount adjustment and focus adjustment of the light beam at the time of installing the light scanning apparatus in the exposure unit is difficult since the light beam reflected by the reflecting surface 120A of the spinner 120 may not reliably be illuminated onto the sensor depending on the position or direction of the reflecting surface 120A when the spinner 120 has stopped.

SUMMARY OF THE INVENTION

The present invention is provided so as to solve the aforementioned problems, and an object of the present invention is to provide a light scanning apparatus capable of stopping rotation of a rotating reflector at a position at which a reflecting surface formed thereon faces a predetermined direction.

In order to achieve the aforementioned object, in a first aspect of the present invention, a light scanning apparatus comprises a rotating reflector having at least one reflecting surface rotated around a rotation axis, the rotating reflector reflecting and deflecting an incident light beam by the at least one reflecting surface, and a control means for controlling a stopping position of the rotating reflector so that the rotating reflector stops rotating in a state in which one reflecting surface of the at least one reflecting surface faces a certain direction, wherein the light scanning apparatus scans an exposure surface of a recording medium by the light beam reflected from the at least one reflecting surface of the rotating reflector In accordance with the first aspect, when the supply of electrical power to a driving means for rotatingly driving the rotating reflector is stopped after scanning of the recording medium by the light beam is completed, the control means controls the stopping position of the rotating reflector so that rotation of the rotating reflector is stopped in a state in which the reflecting surface formed thereon faces a predetermined direction. The stopping position of the rotating reflector is controlled such that, for example, the rotating reflector stops in a state in which the reflecting surface thereof faces the start of scan position on the recording medium.

In a second aspect of the present invention, the light scanning apparatus comprises holding means for preventing rotation of the rotating reflector which is stopped by the control means in the state in which the at least one reflecting surface faces a certain direction, and for holding the rotating reflector in the stopped state.

In accordance with the second aspect, when the rotating reflector is stopped such that the reflecting surface faces a certain direction, the holding means can prevent rotation of the rotating reflector and can prevent the direction of the reflecting surface from being changed.

In the present invention, a spinner, which is a single surface mirror having a reflecting surface inclined at a certain angle with respect to the axial direction of the rotation axis and which reflects a light beam incident along the axial direction, or a polygon mirror, on which plural surfaces parallel to the axial direction are provided, can be used as the rotating reflector.

In a third aspect of the present invention, the control means comprises a first magnetic body provided inside the rotating reflector and rotated integrally with the rotating reflector, and a second magnetic body provided on a locus of rotation of the first magnetic body and in a state of non-contact with the rotating reflector, the second magnetic body and the first magnetic body generating attraction therebetween at least when the rotating reflector stops rotating.

For example, a permanent magnet can be used as the first magnetic body and can be built into the rotating reflector at a certain position thereof. A magnet can be used as the second magnetic body and can be disposed at a certain position opposing the locus of rotation of the permanent magnet which is rotated integrally with the rotating reflector.

This allows the rotating reflector to stop rotating in the state in which the reflecting surface of the rotating reflector faces a direction determined by the location of the permanent magnet and the magnet due to the attraction therebetween.

In a fourth aspect of the present invention, the controlling means comprises a gear engaging portion provided coaxially with the rotating reflector and rotating integrally with the rotating reflector, a gear engageable with the gear engaging portion, moving means for moving the gear between an engagement position and a non-engagement position with the gear engaging portion, gear driving means for rotatingly driving the gear, and setting control means for, after the gear has been engaged with the gear engaging portion by being moved to the engagement position by the moving means when rotation of the rotating reflector is stopped, directing the reflecting surface to face a preset direction by rotating the gear and thus the rotating reflector by using the gear driving means.

In this case, while the rotating reflector is rotating due to inertia before it stops or after the rotating reflector stops rotating, the setting control means moves, by the moving means, the gear to the position where the gear engages with the gear engaging portion. Subsequently, the rotating reflector rotates as the gear rotates since the gear is engaged with the gear engaging portion.

Moreover, in the fourth aspect, it is preferable that the control means comprises detecting means for detecting a light beam reflected by a certain reflecting surface when rotation of the rotating reflector is stopped, and that the setting control means controls the gear driving means based on the results of detection of the detecting means.

In accordance with the fourth aspect, the gear driving means rotatingly drives the gear so that the light beam reflected by the reflecting surface of the rotating reflector can be detected by the detecting means. A light amount sensor, for example, may be used as the detecting means. The light amount sensor may be provided, for example, at a position corresponding to a start of scan position at the recording medium.

In accordance with a fifth aspect of the present invention, the control means may comprise angle recognition means for recognizing (detecting) a rotation angle of the rotating reflector, and the setting control means may control the gear driving means based on the rotation angle recognized by the angle recognition means.

In this case, when the rotation angle of the rotating reflector recognized by the angle recognition means becomes a certain preset angle such as the angle at which the reflecting surface of the rotating reflector faces the start of scan position, the rotational driving of the gear is stopped so as to stop the rotation of the rotating reflector.

In accordance with the fifth aspect, the stopping position of the rotating reflector can be set and controlled, so that rotation of the rotating reflector can be stopped in the state in which the reflecting surface formed thereon faces a predetermined direction.

In a sixth aspect of the present invention, the control means may comprise a brake mechanism provided in the vicinity of the rotation axis of the rotating reflector, setting control means for stopping the rotating reflector by operating the brake mechanism when the reflecting surface faces a certain preset direction, and adjusting means for adjusting a direction of the reflecting surface by causing inching rotation of the rotating reflector whose rotation has been stopped.

In this case, a D.C. motor, for example, which rotatingly drives the rotating reflector may be driven for an instant, thereby rotating the rotating reflector slightly. The reflecting surface of the rotating reflector is made to face a certain direction by inching rotation which is performed by repeatedly driving the rotating reflector for only an instant at predetermined intervals, and the brake mechanism is then operated at an appropriate position.

In a seventh aspect of the present invention, a cleaning means for cleaning the reflecting surface may be provided so as to oppose the rotating reflector which has been stopped by the control means in the state in which the reflecting surface faces a certain direction.

In accordance with the seventh aspect, cleaning of the reflecting surface can be automated by stopping the rotating reflector such that the reflecting surface faces the cleaning means.

In accordance with the aforementioned aspects of the present invention, because rotation of the rotating reflector can be stopped in a state in which the reflecting surface formed thereon faces a predetermined direction, the structure of the apparatus can be prevented from becoming complicated and the manufacturing cost can be reduced.

Moreover, since the light amount and the like of the light beam reflected by the reflecting surface of the rotating reflector can be detected while rotation of the rotating reflector is stopped, a deterioration in the accuracy of detection can be prevented and the light amount and the like of the light beam can easily be adjusted.

BRIEF DESCRIPTION OF THE DRAWINGS

FIG. 2 is a perspective view showing a detailed structure of an exposure unit of the light scanning apparatus according to the present invention.

FIG. 3A is a schematic perspective view showing a deflector and other devices around the deflector in a light scanning apparatus according to a first embodiment of the present invention.

FIG. 3B is a schematic sectional view showing the positional relationship between a rotating reflector, a permanent magnet embedded inside the rotating reflector, and a U-shaped magnet of the light scanning apparatus according to the first embodiment of the present invention.

FIG. 11 is a diagram schematically showing inching rotation of a D.C. motor according to the fifth embodiment.

FIG. 12 is a schematic perspective view of a deflector and other devices around the deflector showing a variation of a cleaning means according to the fifth embodiment.

FIG. 13 is a schematic perspective view of a deflector and other devices around the deflector showing another variation of a cleaning means according to the fifth embodiment.

DETAILED DESCRIPTION OF THE PREFERRED EMBODIMENTS

FIRST EMBODIMENT

Figure 1:
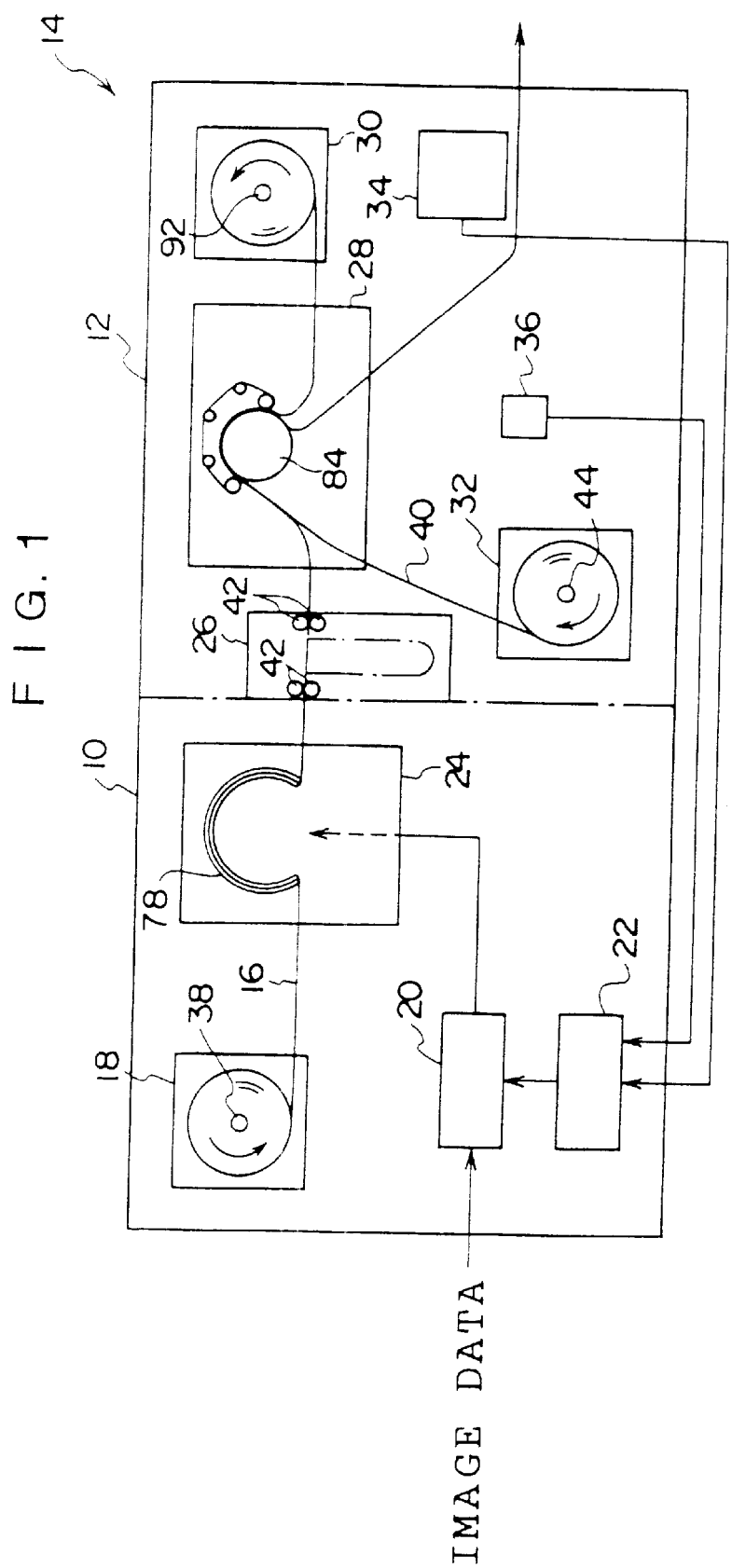
FIG. 1 is a schematic block diagram showing an internal structure of an image forming device, to which a light scanning apparatus of the present invention is applied, and an image processing device connected to the image forming device.

FIG. 1 schematically illustrates the inner structure of a box-shaped image forming device 14 comprising an image exposure device 10 and an image processing device 12. In the image exposure device 10 of the image forming device 14, a light scanning apparatus of the present invention is incorporated.

The image exposure device 10 comprises a photosensitive material loading section 18, a correction circuit 20, a corrected data generating section 22, and an exposure unit 24. Moreover, the image processing device 12 comprises a face portion 26, a heat developing unit 28, a photosensitive material take-up section 30, an image receiving paper loading section 32, a color determination sensor 34, and a temperature-humidity sensor 36.

A roll of photosensitive material 16 wound around a paper winding shaft 38 is loaded in the photosensitive material loading section 18 of the image exposure device 10. The photosensitive material 16 loaded in the photosensitive material loading section 18 is driven by conveying rollers (not shown) so as to be fed in a certain direction.

The exposure unit 24 is provided at the downstream side in the conveying direction of the photosensitive material 16. An output terminal of the correction circuit 20, which corrects image data, is connected to the exposure unit 24. The corrected image data generated in the correction circuit 20 is input to the exposure unit 24. That is, in the exposure unit 24, instructions are given to drive a laser 52 (FIG. 2) on the basis of the corrected image data, to scan and expose the photosensitive material 16 by a light beam.

Moreover, a so-called inner spinner arrangement, which will be described in detail later, is employed in the exposure unit 24. In this arrangement, a circular arc-shaped drum 78, whose central angle is 180° or more, is provided in the exposure unit 24, and the photosensitive material 16 is set at and conveyed along the inner circumferential surface of the drum 78 where the light beam is illuminated onto the photosensitive material 16 from the interior of the drum 78.

An output terminal of the corrected data generating section 22 is connected to the correction circuit 20. Output terminals of the temperature-humidity sensor 36 and the color determination sensor 34 provided in the image processing device 12 are connected to the corrected data generating section 22.

The temperature-humidity sensor 36 is a sensor which detects temperature and humidity within the image processing device 12. The color determination sensor 34 is a sensor which determines the color of the image recorded on an image reception sheet 40 which has been heat developed by the heat developing unit 28.

Accordingly, on the basis of the data detected (measured) by the temperature-humidity sensor 36 and the color determination sensor 34, the corrected data generating section 22 generates data which is used in correcting the image data in the correction circuit 20.

Referring now to FIG. 2, the detailed structure of the exposure unit 24 will be described.

As shown in FIG. 2, a light scanning apparatus 48 is provided in the exposure unit 24. On a base 50 of the light scanning apparatus 48, the laser 52 as a light source, a transmission filter 54 which collects and transmits the light beam emitted from the laser 52, a transmission lens 56, and a light deflector 58 (referred to as a "spinner" hereafter) which deflects the light beam are mounted along the longitudinal direction of the base 50.

The laser 52, the transmission filter 54, and the transmission lens 56 are mounted on the same plane of the base 50 so as not to block a reflected light path of the light beam deflected by the spinner 58. That is, the laser 52, the transmission filter 54, and the transmission lens 56 are mounted on the same plane of the base 50 so that none of these members blocks the light beam deflected by the spinner 58.

This arrangement ensures an effective scan angle of at least 180° for the light beam while facilitating the work of mounting the optical members such as the spinner 58 and preventing the positioning accuracy from deteriorating.

The laser 52 is fixed on a laser mounting platform 60, one surface of which is fixedly mounted on the base 50. The transmission filter 54 and the transmission lens 56 are mounted on the base 50 through a mirror fixing platform 62 and a lens fixing platform 64 respectively, so that the light beam emitted from the laser 52 proceeds parallel to the surface of the base 50.

The spinner 58 comprises a driving member 68 with a built-in motor (not shown), a rotation shaft 70, one end of which is connected to the motor built-in in the driving member 68, and a rotating reflector 72 which is connected to the other end of the rotation shaft 70 and has a reflecting surface 72A which is formed at an angle with respect to a plane perpendicular to the axis of the rotating reflector 72 such that the reflecting surface 72A receives the light beam transmitted through the transmission lens 56 and travelling along the proceeding direction thereof. Moreover, the spinner 58 is positioned and mounted on the base 50 by fixing the driving member 68 onto a deflector platform 66.

The light beam emitted from the laser 52 and transmitted through the transmission filter 54 and the transmission lens 56 proceeds along a line which coaxial with the rotation shaft 70 of the spinner 58, and is incident on the reflecting surface 72A of the rotating reflector 72. The built-in motor (not shown) of the driving member 68 is driven and rotates the rotating reflector 72. This causes the light beam incident on the reflecting surface 72A of the rotating reflector 72 to be reflected and deflected to scan, in a main scanning direction, the photosensitive material 16 which has been set at the inner circumferential surface of the drum 78.

Moreover, as shown in FIG. 3A and FIG. 3B, a long cylindrical permanent magnet 95 is embedded inside the rotating reflector 72 along the direction perpendicular to the axis of the rotating reflector 72. One end of this permanent magnet 95 forms the north pole and the other end thereof the south pole, as shown in FIG. 3B. The permanent magnet 95 rotates along with the rotation of the rotating reflector 72.

A U-shaped magnet 96 is mounted on the base 50 along at least a portion of the locus of rotation of the both ends of the permanent magnet 95. The magnet 96 is mounted such that it does not contact the rotating reflector 72. Furthermore, in the same manner as the permanent magnet 95, one end of the magnet 96 forms the north pole and the other the south pole as shown in FIG. 3B. In the present first embodiment of the present invention, the end of the magnet 96 forming the south pole is fixedly mounted to the base 50.

When driving of the rotating reflector 72 is stopped, the permanent magnet 95 and the magnet 96 come to a standstill in a state in which opposite polarities of the two magnets face each other. That is, when the power supply to the driving means (not shown) of the rotating reflector 72 is stopped, the rotating reflector 72 rotates due to inertia for a little while, and then eventually stops at a position at which opposite polarities of the permanent magnet 95 and the magnet 96 face each other.

Accordingly, the magnet 96 is disposed such that the poles thereof are located at positions to which the opposite poles of the permanent magnet 95 are attracted such that the rotation of the rotating reflector 72 can always be stopped at the position at which the reflecting surface 72A formed on the rotating reflector 72 faces a predetermined direction.

A light amount sensor 98 is provided at a position corresponding to the start of scan position of the rotating reflector 72 with respect to the photosensitive material 16, such that the reflected light path of the light beam reflected by the reflecting surface 72A of the rotating reflector 72 does not intersect the photosensitive material 16. The permanent magnet 95 is embedded inside the rotating reflector 72 by adjusting the position at which one polarity of the permanent magnet 95 and the opposite polarity of the magnet 96 face each other such that the light beam reflected by the rotating reflector 72 which is in a stopped state can be reliably illuminated onto and detected by the light amount sensor 98.

Therefore, when the supply of electrical power to the built-in motor (not shown) of the driving member 68 is stopped, the permanent magnet 95 and the magnet 96 face each other at the position where the light amount sensor 98 detects the light beam reflected by the reflecting surface 72A formed on the rotating reflector 72. That is, the rotation of the rotating reflector 72 stops rotating at the position at which the reflecting surface 72A faces a predetermined direction.

Moreover, the light amount sensor 98 detects the light beam reflected by the reflecting surface 72A formed on the rotating reflector 72 so as to measure the light amount.

Further, the light amount sensor 98 may be an SOS sensor (start of scan sensor) or may be another sensor provided separately from the SOS sensor. Furthermore, the light source for the light beam, which is to be detected by the light amount sensor 98, may be the laser 52 used for scanning, or another light source may be provided separately.

Rectangular cut-away portions 50A (see FIG. 2) are formed in the both transverse direction ends of the base 50 between the transmission lens 56 and the spinner 58, thereby preventing the reflected light path of the light beam deflected by the reflecting surface 72A of the rotating reflector 72 from being blocked by the base 50. Accordingly, the light beam can even scan the photosensitive material 16 placed at the reverse side (the lower side in FIG. 2) of the base 50. That is, this structure can secure an effective scan angle of at least 180° for the light beam.

Moreover, a lead screw 74 is provided in the light scanning apparatus 48 along the longitudinal direction of the base 50. A movement supporting member 76, in which an insertion hole 76A through which the lead screw 74 is inserted is formed, is fixedly mounted to the reverse side of the base 50.

Thus, the base 50, on which the laser 52, the transmission filter 54, the transmission lens 56, and the spinner 58 are mounted, is movable along the longitudinal direction of the lead screw 74 (the direction indicated by arrow A in FIG. 2) as the lead screw is rotated by means of a driving force supplied by a driving source (not shown).

Moreover, a circular arc-shaped drum 78 whose central angle is at least 180° is provided in the exposure unit 24 so as to cover the light scanning apparatus 48. The drum 78 is located such that it is coaxial with the rotation center of the rotating reflector 72 mounted on the base 50.

As previously described, the photosensitive material 16 conveyed from the photosensitive material loading section 18 by means of rollers (not shown) is set at the inner circumferential surface of the drum 78. In the state in which the photosensitive material 16 is set at the inner circumferential surface of the drum 78, the light beam is emitted from the laser 52, the rotating reflector 72 of the spinner 58 rotates, and the base 50 moves along the direction indicated by arrow A (FIG. 2) driven by the rotation of the lead screw 74, thereby enabling the photosensitive material 16 to be scanned by the light beam.

While the rotation of the rotating reflector 72 causes the photosensitive material 16 to be scanned in the main scanning direction, the movement of the base 50 along the lead screw 74 causes the photosensitive material 16 to be scanned in the subscanning direction.

Figure 4:
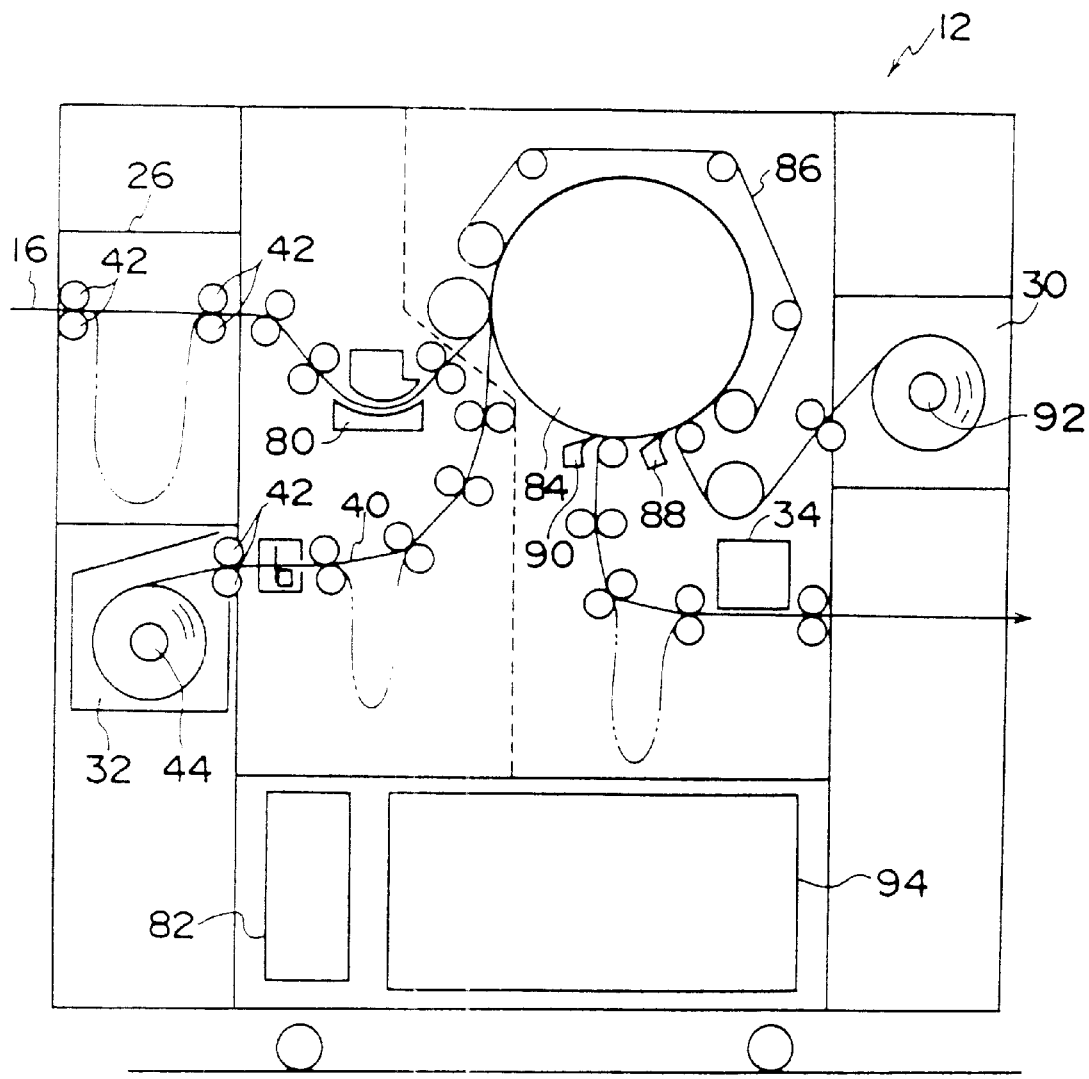
FIG. 4 is a block diagram showing a detailed structure of the image processing device illustrated in FIG. 1.

Referring now to FIG. 4, the internal structure of the image processing device 12 provided adjacent to the image exposure device 10 will be described in detail.

As shown in FIG. 4, a face section 26 is provided adjacent to the connecting portion of the image processing device 12 and the image exposure device 10. A diverging guide (not shown) which is operated by a solenoid is provided in the face section 26. The diverging guide can be switched between a horizontal state and a vertical state. When the diverging guide is switched to the vertical state, the photosensitive material 16 falls slack and sags between transport rollers 42 as indicated by an imaginary line in FIG. 4.

In this way, the speed difference between the processing rate of the image processing device 12 and that of the image exposure device 10 may be cancelled out. Moreover, the driving of the transport rollers 42 is controlled by a control unit 94 provided in the lower portion of the image processing device 12.

The image receiving paper loading section 32 is provided below the face portion 26. An image receiving paper 40 wound around a paper winding shaft 44 is loaded into the image receiving paper loading section 32 and is conveyed therefrom by the transport rollers 42 in a certain direction.

The heat developing unit 28 is provided at the downstream side in the conveying direction of the photosensitive material 16. A water application tank 80 filled with water, which is used as an image forming solvent for the photosensitive material 16, is provided in the heat developing unit 28.

The water application tank 80 is structured such that water is supplied via a pump (not shown) from a water tank 82 provided in a lower portion of the image processing device 12. Application of water onto the photosensitive material 16 improves the adhesion between the image receiving paper 40 and the photosensitive material 16 when they are superposed one on top of the other.

Besides the water application tank 80, a heating drum 84 is also provided in the heat developing unit 28. A heater (not shown) is disposed within the heating drum 84. As the heating drum 84 rotates, the photosensitive material 16 and the image receiving paper 40 are conveyed along the outer peripheral surface of the heating drum 84 and heated for a given period of time (i.e., heat development processing is carried out) to form an image on the image receiving paper 40.

Moreover, in order to prevent slipping between the photosensitive material 16 and the image receiving paper 40 which are being conveyed along the outer peripheral surface of the heating drum 84 in order to ensure accurate formation of an image on the image receiving paper 40, a slip preventing belt 86 is provided in close proximity to the outer periphery of the heating drum 84.

A photosensitive material peeling member 88 which peels the photosensitive material 16 from the image receiving paper 40 with which it is laminated together, and an image receiving paper peeling member 90 which peels the image receiving paper 40 from the heating drum 84 are provided in the vicinity of the heating drum 84 at the downstream side in the conveying direction of the photosensitive material 16 and the image receiving paper 40.

The photosensitive material 16 peeled from the image receiving paper 40 by the photosensitive material peeling member 88 is wound around a winding shaft 92, which is provided in the photosensitive material winding section 30, and is then disposed of as waste.

Furthermore, the color determination sensor 34 is provided at the conveying direction downstream side of the image receiving paper 40, which has been peeled from the heating drum 84 by the image receiving paper peeling member 90 and on which an image has been formed. The color determination sensor 34 determines the color of the image which has been formed on the image receiving paper 40, then outputs the determined data to the corrected data generating section 22 provided in the image exposure device 10. The image receiving paper 40, which has been subjected to color detection by the color determination sensor 34, is then output from the image processing device 12.

Operation of the present first embodiment of the present invention will be described hereinafter.

In the image exposure device 10, when the photosensitive material 16 which has been photographed is loaded into the photosensitive material loading section 18, the transport rollers (not shown) are driven to advance the photosensitive material 16 in a certain direction. When the photosensitive material 16 reaches the exposure unit 24, exposure processing based on the corrected image data output from the correction circuit 20 is started.

The photosensitive material 16 which has reached the exposure unit 24 is then set at and conveyed along the inner circumferential surface of the drum 78. A light beam is then emitted from the laser 52 mounted on the base 50 of the light scanning apparatus 48, and the light beam is illuminated onto the photosensitive material 16 via the transmission filter 54, the transmission lens 56, and the spinner 58. The rotation of the rotating reflector 72 which is a portion of the spinner 58 causes the photosensitive material 16 to be scanned in the main scanning direction. The movement of the base 50, on which the laser 52 and the like are mounted, along the longitudinal direction of the lead screw 74 causes the photosensitive material 16 to be scanned in the sub-scanning direction.

In the exposure unit 24, when exposure processing for the photosensitive material 16 is finished, the supply of electrical power to the motor (not shown) built-in in the driving member 68 is stopped. Generally, the rotating reflector 72 rotates by inertia for a short while immediately after the stoppage of the supply of electrical power to the motor. As previously described, the permanent magnet 95 is embedded inside the rotating reflector 72, and the magnet 96 is mounted around the locus of rotation of the both ends of the permanent magnet 95. Therefore, at this point, the permanent magnet 95 and the magnet 96 eventually come to a standstill and face each other at the position at which the light amount sensor 98 can detect the light beam reflected by the reflecting surface 72A of the rotating reflector 72.

Accordingly, the rotation of the rotating reflector 72 stops at the position at which the reflecting surface 72A thereof faces a predetermined direction. That is, in the present first embodiment, the rotation of the rotating reflector 72 stops at the position at which the light amount sensor 98 can detect the light beam reflected by the reflecting surface 72A of the rotating reflector 72 as shown in FIG. 3A.

The photosensitive material 16 already exposed by the image exposure device 10 is then conveyed to the image processing device 12.

In the image processing device 12, the photosensitive material 16 and the image receiving paper 40 are superposed one on top of the other, and heat development processing is carried out in the heat developing unit 28, thereby forming an image on the image receiving paper 40. The photosensitive material 16 which has been subjected to heat development processing is taken up in the photosensitive material winding section 30 and is disposed of as waste.

On the other hand, the image receiving paper 40 on which an image has been formed is discharged from the image processing device 12 and conveyed to devices of subsequent processes such as a printing processing device.

In this way, after the completion of exposure processing in the exposure unit 24, the rotating reflector 72 provided in the light scanning apparatus 48 stops rotating at the position at which the reflecting surface 72A faces a predetermined direction due to the interaction between one polarity of the permanent magnet 95 and the opposite polarity of the magnet 96.

Figure 5:
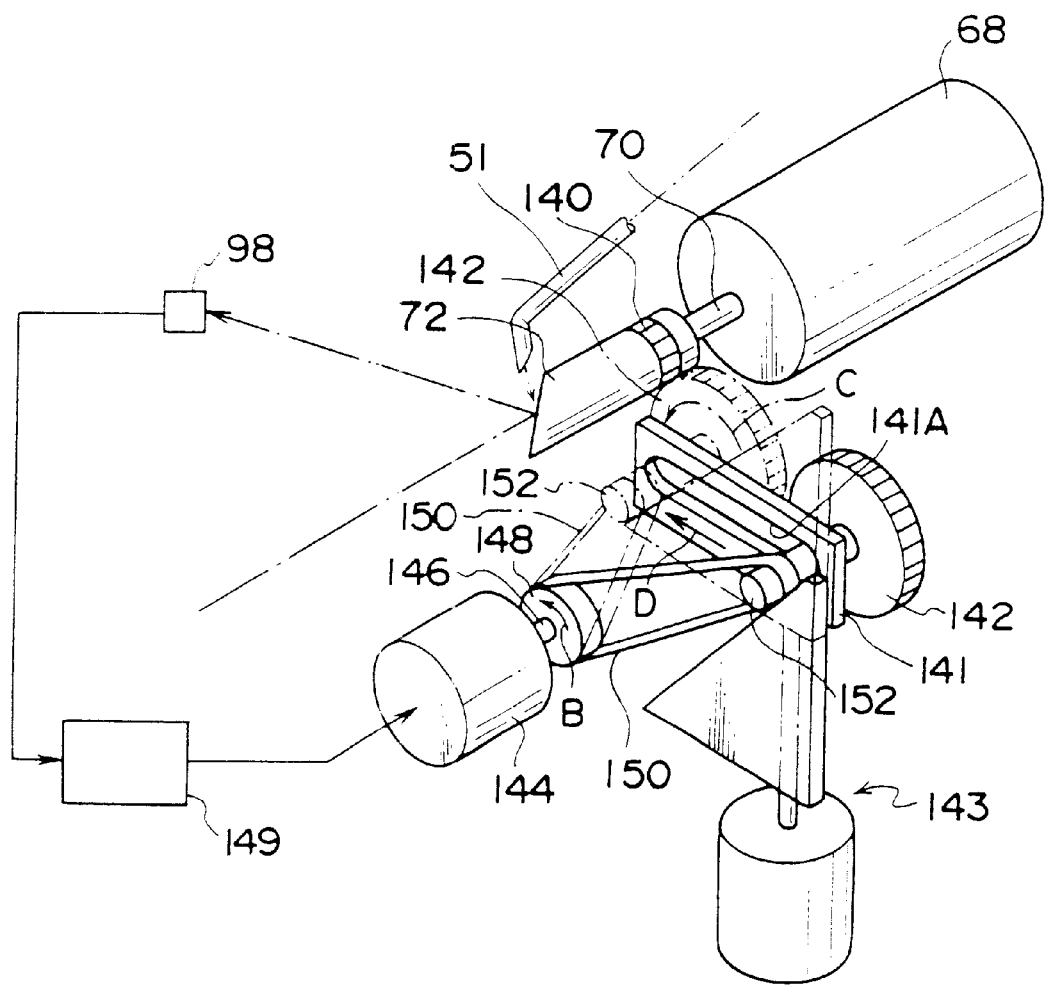
FIG. 5 is a schematic perspective view showing a deflector and other devices around the deflector in a light scanning apparatus according to a second embodiment of the present invention.

Accordingly, for example, plural blower nozzles for cleaning the reflected surface 72A are no longer required. That is, a single blower nozzle similar to a blower nozzle 51 shown in FIG. 5 is sufficient to clean the reflecting surface 72A. Thus, the structure of the light scanning apparatus 48 is prevented from becoming complicated, and the manufacturing cost can be reduced.

Moreover, the light beam reflected by the reflecting surface 72A of the rotating reflector 72 is illuminated onto the light amount sensor 98 when the rotating reflector 72 stops rotating.

Accordingly, because the amount of light of the light beam is detected when the rotation of the rotating reflector 72 is stopped, poor detecting accuracy which is problematic in the prior art can be prevented, and the adjustment of the light amount and the like of the light beam is facilitated. Moreover, since there is no need for a light amount sensor capable of high speed detection, the manufacturing cost of the device can be reduced.

Although the first embodiment of the present invention describes a case in which the U-shaped magnet 96 is provided at the outer periphery of the rotating reflector 72, the present invention is not limited to the same. An electromagnet, for example, can also be used. That is, any magnet having the N-pole on one end and the S-pole on the other at least when the rotating reflector 72 stops rotating can be used.

SECOND EMBODIMENT

A second embodiment of the present invention will be described hereinafter. The second embodiment, in part, uses the substantially the same elements as the first embodiment. Thus, like reference numerals are used to designate identical elements, and detailed description thereof will be omitted.

It should be noted that a blower nozzle 51, in stead of a set of a plurality of blower nozzles, is provided in the vicinity of the reflecting surface 72A of the rotating reflector 72 as shown in FIG. 5 in the same manner as in the first embodiment.

In the first embodiment described above, the rotation of the rotating reflector 72 is stopped at the position at which the reflecting surface 72A thereof faces a predetermined direction, by utilizing the mechanism in which the permanent magnet 95 and the magnet 96 eventually face each other at a predetermined position.

In contrast, in the present second embodiment, a gear rotation shaft 152 is connected to a rotation center of a gear 142 as shown in FIG. 5.

The gear 142 is supported by the gear rotation shaft 152 passing through a long hole 141A formed in a bracket 141.

Moreover, the gear 142 is moved along the longitudinal direction of the long hole 141A formed in the bracket 141 (the direction indicated by arrow D in FIG. 5) by the action of a cylinder 143. That is, the cylinder 143 moves the gear 142 between a position at which the gear 142 engages with a gear engaging portion 140 formed on the rotating reflector 72 and a position at which the gear 142 is separated from the gear engaging portion 140.

Moreover, a motor 144 for rotatingly driving the gear 142 is provided in a vicinity of the bracket 141.

When the gear 142 is engaged with the gear engaging portion 140 formed on the rotating reflector 72, the rotating reflector 72 is rotated as the gear 142 rotates. The motor 144 is connected to an output terminal of a control section 149 for controlling the driving of the motor 144. An input terminal of the control section 149 is connected to an output terminal of the light amount sensor 98. Accordingly, the driving of the motor 144 is controlled by means of the control section 149 in accordance with the state of the light beam detected by the light amount sensor 98.

A motor rotation shaft 146 is connected to the motor 144. A rotation portion 148, which rotates in the direction of arrow B shown in FIG. 5 as the motor 144 rotates, is mounted on one end of the motor rotation shaft 146. A connecting belt 150 is trained around the rotation portion 148 and the gear rotation shaft 152. In this way, the driving force of the motor 144 is transmitted to the gear rotation shaft 142 via the connecting belt 150 to rotate the gear 140 in the direction of arrow C.

Operation of the present second embodiment will now be described.

In the exposure unit 24 provided in the image exposure device 10, when exposure processing for the photosensitive material 16 is completed, the supply of electrical power to the motor (not shown) built-in in the driving member 68 is stopped.

When the rotating reflector 72 stops rotating after the supply of electrical power to the motor is stopped, the cylinder 143 is operated to move the gear rotation shaft 152 along the longitudinal direction of the long hole 141A formed in the bracket 141. This causes the gear 142 to engage with the gear engaging portion 140 formed on the outer peripheral surface of the rotating reflector 72.

After the gear 142 engages with the gear engaging portion 140, the motor 144 is driven.

The gear 142 may be made to engage the gear engaging portion 140 while the rotating reflector 72 is still rotating due to inertia. In this case, it is preferable that the gear 142 is made to engage the gear engaging portion 140 after the motor 144 has been driven so as to rotate the gear 142 at substantially the same rotating speed as that of the rotating reflector 72. That is, buffering of the shock upon engagement is contemplated.

When the motor 144 is driven, the driving force of the motor is transmitted to the gear rotation shaft 152 via the rotation portion 148 and the connecting belt 150, thereby rotating the gear 142 in the direction of arrow C shown in FIG. 5. Since the gear 142 is engaged with the gear engaging portion 140 at this time, the rotating reflector 72 rotates due to rotation of the gear 142.

The light amount sensor 98 detects the light beam reflected by the reflecting surface 72A of the rotating reflector 72. When the light amount sensor 98 detects the light beam, the control section 149 commands the stoppage of the driving of the motor 144.

Accordingly, rotation of the rotating reflector 72 is stopped in the state in which the reflecting surface 72A thereof faces a predetermined direction. That is, the rotation of the rotating reflector 72 is stopped at the position at which the reflecting surface 72A of the rotating reflector 72 faces the start of scan position.

In this way, the rotation of the rotating reflector 72 can be stopped at the position at which the reflecting surface 72A thereof faces a predetermined direction, by forming the gear engaging portion 140 on the outer peripheral surface of the rotating reflector 72, by having this gear engaging portion 140 engage with the gear 142, and by rotating the rotating reflector 72 until the light amount sensor 98 detects the light beam.

Accordingly, in the same way as in the first embodiment, for example, plural blower nozzles for cleaning the reflecting surface 72A are no longer required. That is, the single blower nozzle 51 suffices to clean the reflecting surface 72A. Thus, the structure of the light scanning apparatus 48 can be prevented from becoming complicated, and the manufacturing cost thereof can be reduced.

Moreover, the light beam reflected by the reflecting surface 72A of the rotating reflector 72 is detected by the light amount sensor 98 when the rotating reflector 72 stops rotating.

Accordingly, the present second embodiment can prevent the detecting accuracy of the light beam from deteriorating and can facilitate the adjustment of the light amount and the like of the light beam. Moreover, since there is no need for a light amount sensor capable of high speed detection, the manufacturing cost of the apparatus can be reduced.

The second embodiment of the present invention describes a case in which when the light amount sensor 98 detects the light beam reflected by the reflecting surface 72 of the rotating reflector 72, driving of the motor 144 is instructed so that the rotation of the rotating mirror 72 is stopped. However, the present invention is not limited to the same. For example, driving of the motor 144 may be instructed, when the rotation angle of the rotating reflector 72 becomes a certain angle, thereby stopping the rotation of the rotating reflector 72. This example will be described as a third embodiment of the present invention hereinafter.

THIRD EMBODIMENT

The third embodiment, in part, uses substantially the same elements as the above-described second embodiment. Thus, like reference numerals are used to designate identical elements, and detailed description thereof will be omitted.

Figure 6:
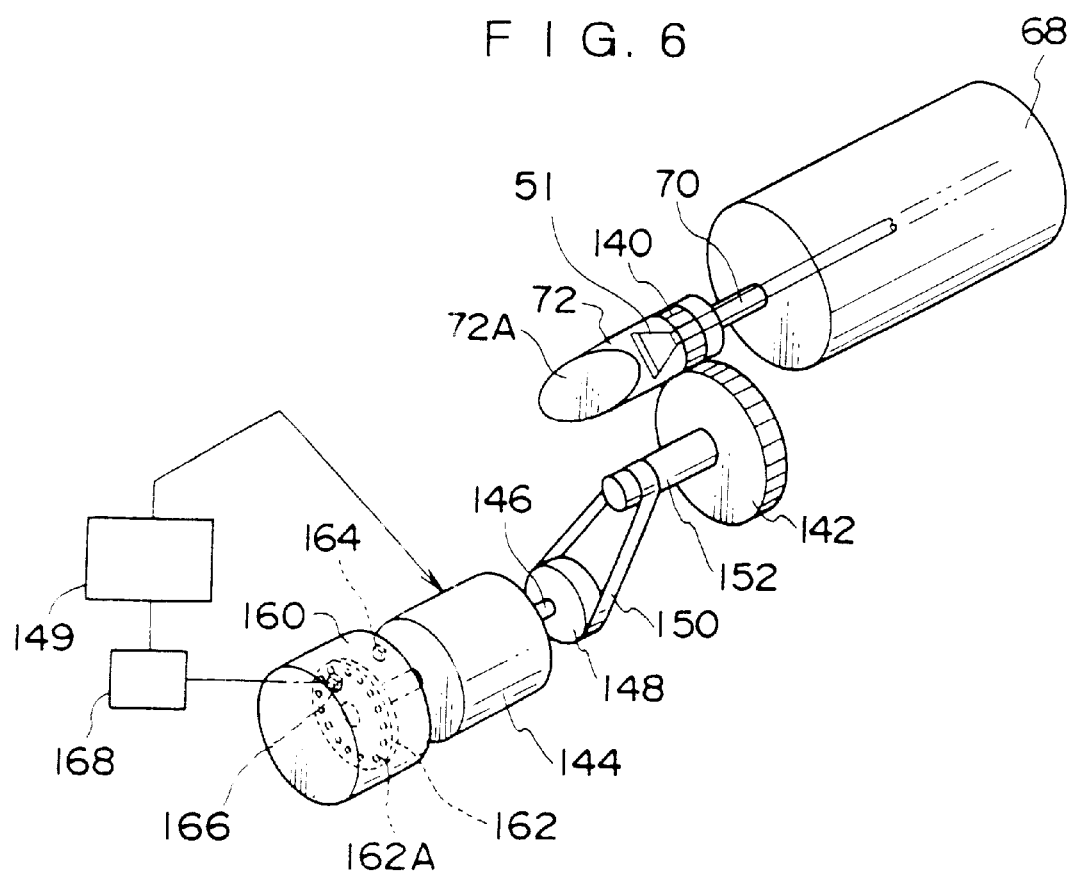
FIG. 6 is a schematic perspective view showing a deflector and other devices around the deflector in a light scanning apparatus according to a third embodiment of the present invention.

In the present third embodiment, the gear 142 is provided so as to engage the gear engaging portion 140 formed on the outer peripheral surface of the rotating reflector 72 as shown in FIG. 6.

The connecting belt 150 is trained around the gear rotation shaft 152 of the gear 142 and the rotation portion 148 mounted on one end of the motor rotation shaft 146 of the motor 144. A rotary encoder 160 provided for recognizing the rotational state of the rotating reflector 72 is connected to the other end of the motor rotation shaft 146 of the motor 144.

The rotary encoder 160 includes a disk 162 in which plural slit holes 162A are formed, a light-emitting element 164, and a light-receiving element 166. Simultaneously with the driving of the motor 144, the light-emitting element 164 emits a light beam toward the position at which the light-receiving element 166 is disposed. The light-receiving element 166 detects the light which has passed through the slit holes 162A of the disk 162. The disk 162 rotates simultaneously with the driving of the motor 144.

Accordingly, the rotational state of the rotating reflector 72 can be recognized by detecting the rotational state of the disk 162.

Moreover, an output terminal of the light-receiving element 166 is connected to an angle sensor 168. The angle sensor 168 determines a rotation angle of the rotating reflector 72 based on the light state detected by the light-receiving element 166, i.e., based on the rotational state of the rotating reflector 72. This angle sensor 168 is connected to the control section 149 for controlling the driving of the motor 144.

Accordingly, when the rotation angle of the rotating reflector 72 determined by the angle sensor 168 becomes a certain angle, the control section 149 instructs the stopping of the rotation of the motor 144.

When the supply of electrical power to the motor (not shown) built-in in the driving member 68 is stopped after exposure processing is completed, the motor 144 is driven to rotate the gear 142. It should be noted that, in the present third embodiment, the gear engaging portion 140 formed on the rotating reflector 72A is permanently engaged with the gear 142. Accordingly, while the rotating reflector 72 is rotated by the driving member 68, the gear 142 and the motor 144 are rotated idly due to the engagement of the gear 142 with the gear engaging portion 140.

Subsequent to the actuation of the motor 144 after the supply of electrical power to the motor built-in in the driving member 68 has been stopped, the rotational state of the rotating reflector 72 is recognized by the rotary encoder 160 and the rotation angle of the rotating reflector 72 is determined by the angle sensor 168.

When the rotation angle determined by the angle sensor 168 is a certain angle (the angle at which the reflecting surface 72A of the rotating reflector 72 faces the start of scan position), the control section 149 instructs the stopping of the driving of the motor 144, thereby enabling the rotating reflector 72 to stop rotating at the position at which the reflecting surface 72A thereof faces a predetermined direction.

Figure 7:
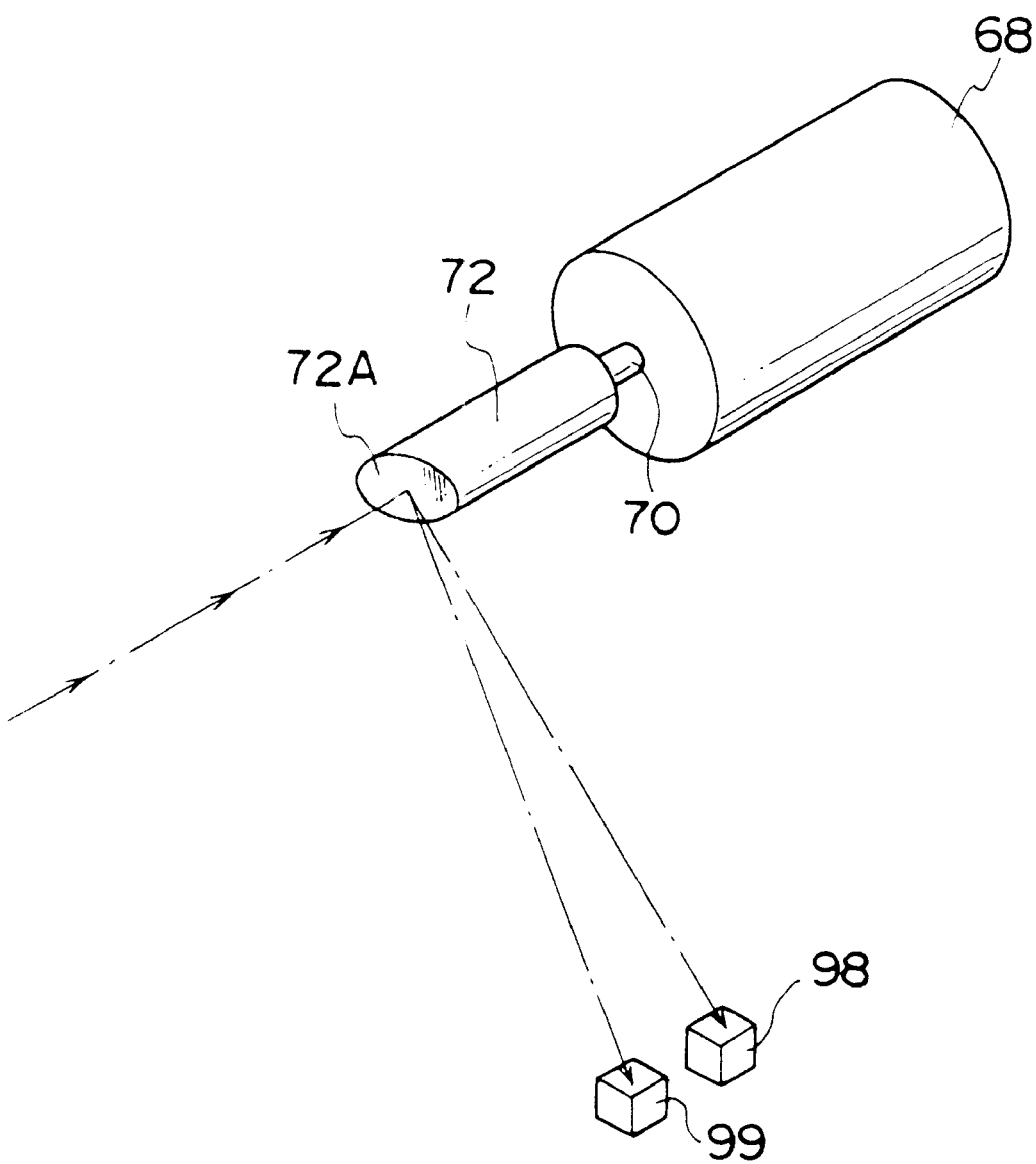
FIG. 7 is a schematic perspective view showing a variation of a deflector and other devices around the deflector in a light scanning apparatus, which variation is applicable to any of the first through third embodiments of the present invention.

Moreover, it is not necessary to clean the reflecting surface 72A of the rotating reflector 72 throughout the time when the rotation of the rotating reflector 72 is stopped. That is, it suffices to clean the reflecting surface 72A only when an amount of dust or the like adhering thereto exceeds a given amount and the reflectance of the reflecting surface 72A becomes a given value or less. Therefore, in addition to the light amount sensor 98, a scattered light sensor 99 may be provided in each embodiment of the present invention as shown in FIG. 7.

When dust or the like adheres to the reflecting surface 72A, the light beam reflected by the reflecting surface 72A scatters. Therefore, when dust or the like has been adhering to the reflecting surface 72A, the light beam is detected both by the light amount sensor 98 and the scattered light sensor 99 provided in the light scanning apparatus 48.

Accordingly, each of the above-described embodiments of the present invention may be structured such that, when the scattered light sensor 99 detects a certain amount of a light beam or more, it is judged that the reflecting surface 72A needs to be cleaned, and air is jetted out from the blower nozzle 51 to clean the reflecting surface 72A.

FOURTH EMBODIMENT

A fourth embodiment of the present invention will be described hereinafter. In the fourth embodiment, the same reference numerals are used to designate identical elements described in the above first to third embodiments, and detailed description thereof will be omitted.

Figure 8:
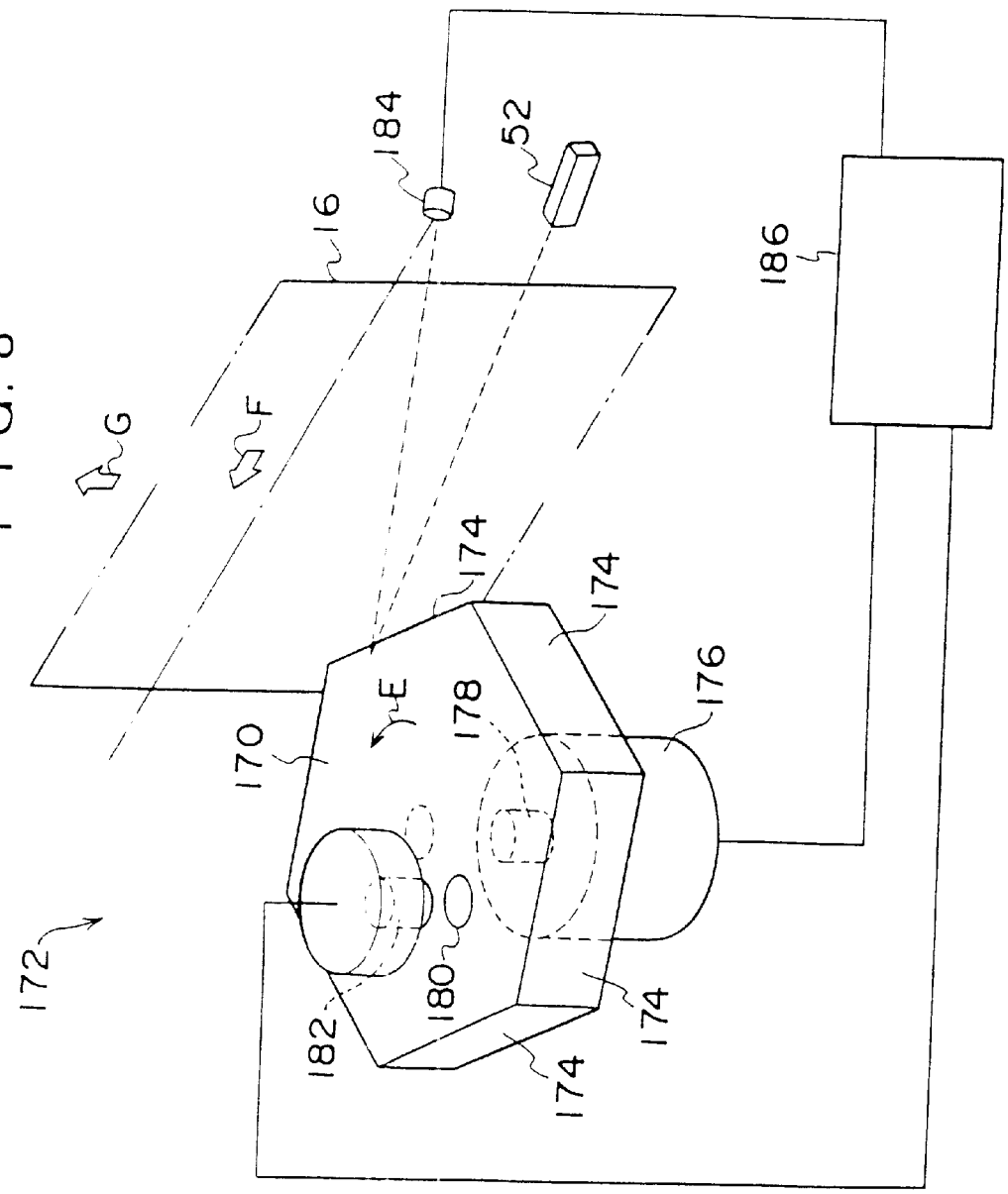
FIG. 8 is a perspective view of main portions showing a deflector and other devices around the deflector in a light scanning apparatus according to a fourth embodiment of the present invention.

FIG. 8 illustrates main portions of a light scanning apparatus 172 using a rotating polygon mirror (referred to as a "polygon mirror 170" hereinafter) which is provided with plural reflecting surfaces and which serves as a rotating reflector. The polygon mirror 170 provided in the light scanning apparatus 172 is formed to have six reflecting surfaces 174, and is shaped as a equilateral hexagon when seen from the top.

Figure 10:
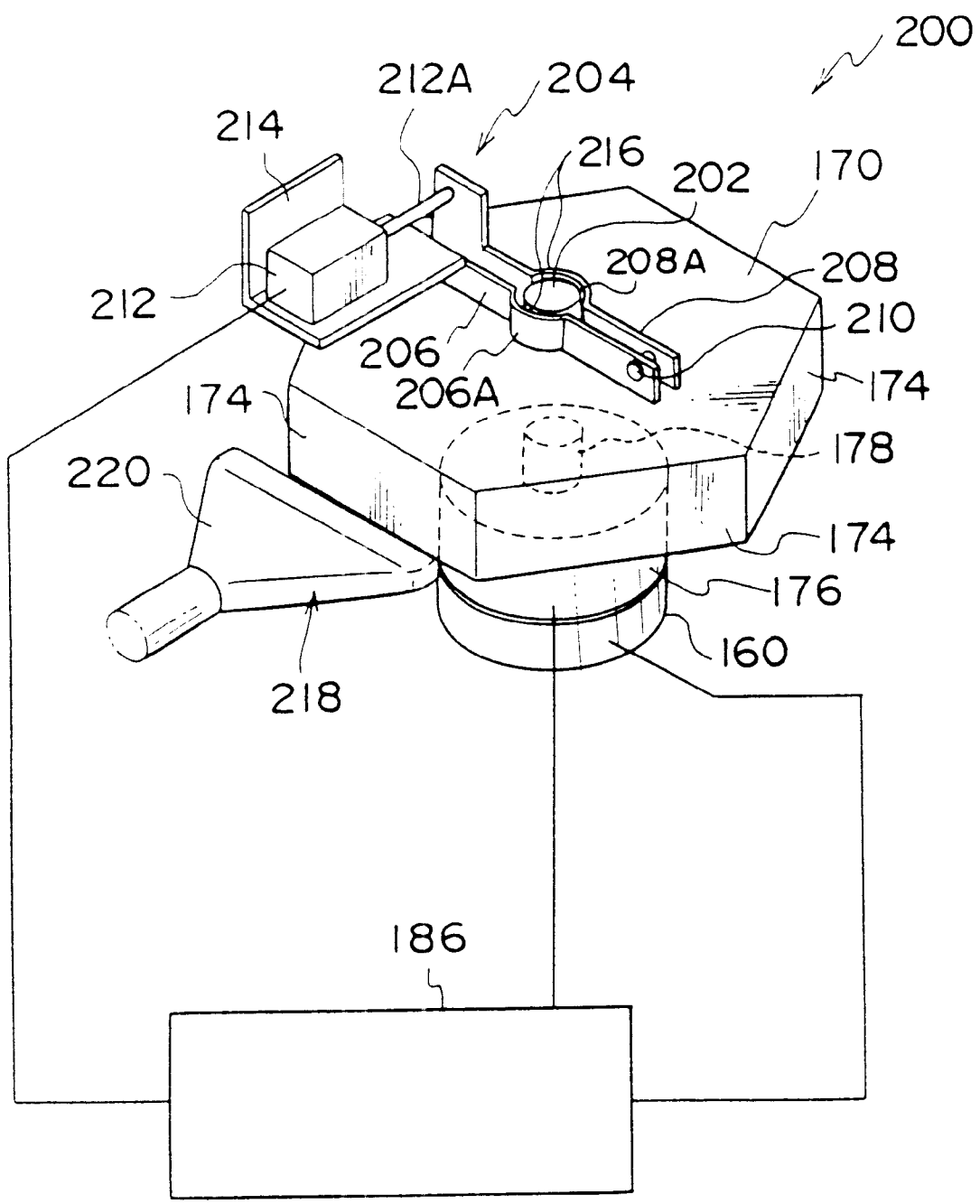
FIG. 10 is a perspective view of main portions showing a schematic structure of a deflector and other devices around the deflector in a light scanning apparatus according to a fifth embodiment of the present invention.
Figure 14A:
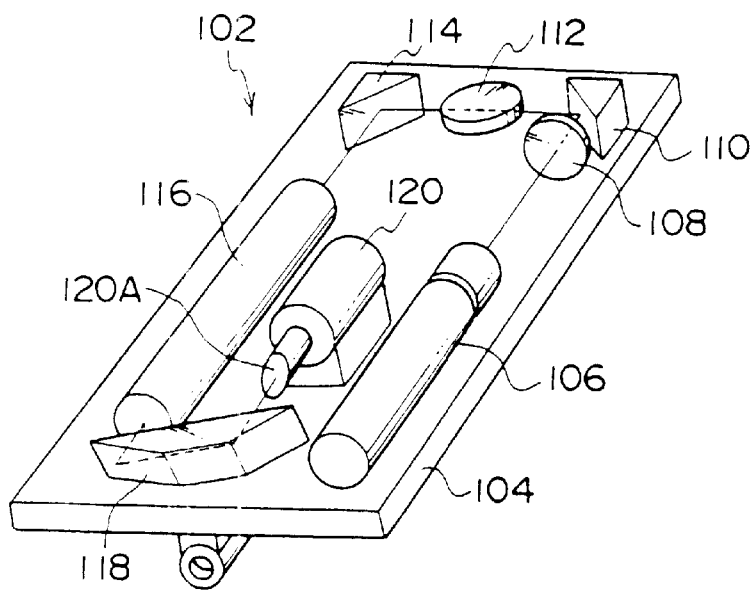
FIG. 14A is a perspective view of a structure on a base in a light scanning unit of the prior art.
Figure 14B:
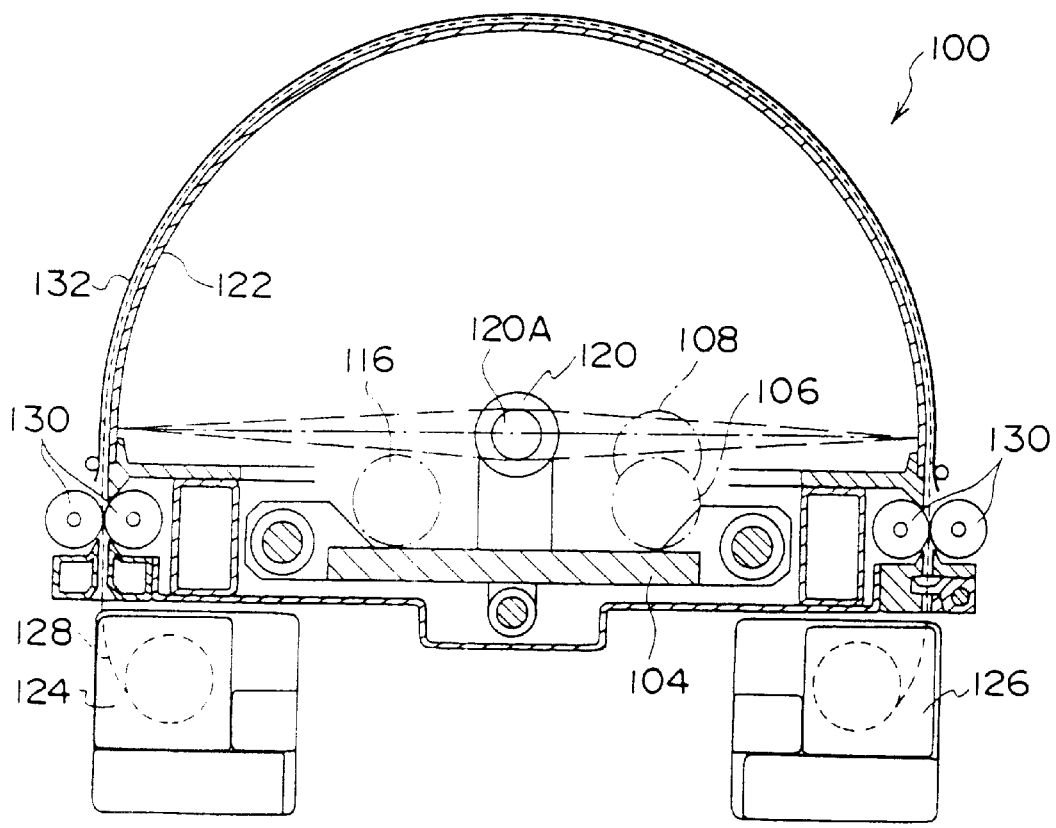
FIG. 14B is a side view of a light scanning unit of the prior art including the structure on the base shown in FIG. 14A seen from a transverse direction of the base thereof.

It should be noted that a cleaning mechanism similar to a cleaning mechanism 218 shown in FIG. 10 may be provided in the light scanning apparatus 200. Such a cleaning mechanism may include a blower nozzle facing the polygon mirror 170.

The rotation center of the polygon mirror 170 is connected to a motor rotation shaft 178 of a D.C. motor 176, and the polygon mirror 170 is rotated in, for example, the direction of arrow E by the driving of the D.C. motor 176.

A light beam from the laser 52 is irradiated onto the polygon mirror 170. The light beam is reflected by the reflecting surface 174 of the polygon mirror 170, and is illuminated onto the photosensitive material 16. At this time, the rotation of the polygon mirror 170 driven by the driving force of the D.C. motor 176 causes the light beam to scan the photosensitive material 16 in the main scanning direction (direction indicated by arrow F), whereas the photosensitive material 16 is moved in the direction indicated by arrow G by a sub-scanning means (not shown).

Accordingly, the photosensitive material 16 is scanned in the main scanning direction and the sub-scanning direction by the light beam, such that an image is exposed thereon. Moreover, any structure using the polygon mirror 170 can be used as the light scanning apparatus 172. In FIG. 8, the optical system through which the light beam passes is omitted. Furthermore, in the present fourth embodiment, a detailed description of the exposure unit using the polygon mirror 170 will be omitted.

In the light scanning apparatus 172, an SOS sensor 184 is provided outside of the image recording area of the photosensitive material 16. The SOS sensor 184, as well as the D.C. motor 176, are connected to a control section 186.

The control section 186 judges when to start image recording by the SOS sensor 184 detecting the light beam scanned in the main scanning direction due to the rotation of the polygon mirror 170.

The polygon mirror 170 is formed of a non-magnetic material, such as aluminum, which is not attracted by magnetic force. Moreover, on the top face of the polygon mirror 170, a thin disk 180 is mounted at a position which is not on the rotation center. The disk 180 is formed of a magnetic material, such as iron, which is attracted by magnetic force.

By forming a hollow portion (not shown), which corresponds to the weight of the disk 180, beneath the mounting position of the disk 180, the center of gravity of the polygon mirror 170 is prevented from deviating from the rotation center in a case in which the disk 180 is mounted on the polygon mirror 170. The method of preventing the center of gravity of the polygon mirror 170 from deviating from the rotation center is not limited to this method, and any of other methods may be used.

An electromagnet 182 is provided above the polygon mirror 170. The electromagnet 182 is provided in proximity to the polygon mirror 170 at a certain position opposing the locus of rotation of the disk 180 attached to the polygon mirror 170 at the time the polygon mirror 170 rotates. The electromagnet 182 is connected to the control section 186.

The control section 186 stops the supply of electrical power to the D.C. motor 176, and when the rotation of the polygon mirror 170 is stopped, the control section 186 energizes the electromagnet 182. Accordingly, in the light scanning apparatus 172, the magnetic force generated by the electromagnet 182 attracts the disk 180 mounted on the top face of the polygon mirror 170, and the polygon mirror 170 stops at the position at which the disk 180 opposes the electromagnet 182. Moreover, the polygon mirror 170 is maintained in this position by continuous energization of the electromagnet 182 while the polygon mirror 170 is stopped.

In the light scanning apparatus 172, at the position at which the electromagnet 182 opposes the disk 180, the light beam emitted from the laser 52 is irradiated onto the SOS sensor 184. This allows the SOS sensor 184 to measure the light amount of the light beam emitted from the laser 52 and irradiated onto the photosensitive material 16.

The control section 186 urges cleaning of the reflecting surface 174 of the polygon mirror 170 when the light amount of the light beam detected by the SOS sensor 184 becomes lower than a certain level.

Figure 9:
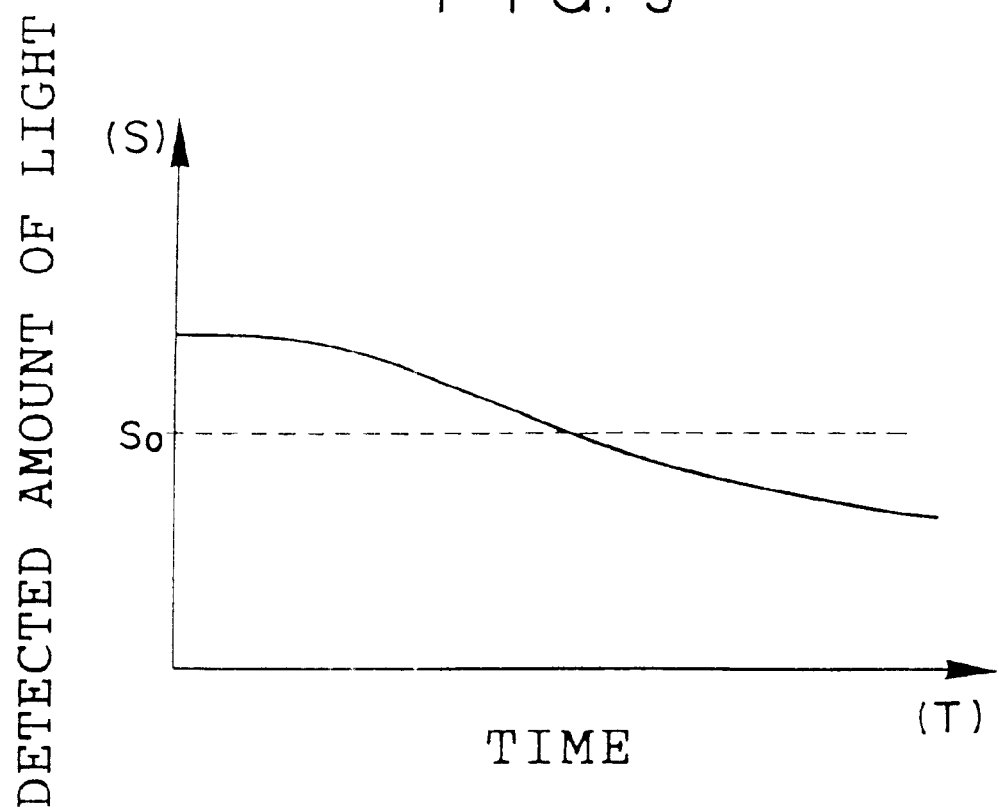
FIG. 9 is a diagram schematically showing a change in light amount detected by an SOS sensor according to the fourth embodiment.

That is, as time passes, dust or the like is deposited on the reflecting surface 174 of the polygon mirror 170, and as the reflecting surface 174 becomes dirty, the reflectance thereof deteriorates. Accordingly, the light amount detected by the SOS sensor 184 gradually decreases as shown in FIG. 9.

The control section 186 urges cleaning of the polygon mirror 170 when the light amount detected by the SOS sensor 184 becomes lower than a preset value $S_0$. Any method can be used as a signal means for urging that the polygon mirror 170 be cleaned.

In the light scanning apparatus 172 structured in this way, the electrical power is supplied to the D.C. motor 176 to rotatingly drive the polygon mirror 170 at high speed. At the same time in the light scanning apparatus 172, the laser 52 emits the light beam toward a certain position on the polygon mirror 170, while the photosensitive material 16 is being transported in the sub-scanning direction as described above. While rotating at high speed, the polygon mirror 170 reflects the light beam by the reflecting surface 174 opposing the photosensitive material 16, thereby causing the light beam to scan along the main scanning direction. The photosensitive material 16 is thereby scanned and exposed by the light beam.

In the light scanning apparatus 172, when the exposure of the photosensitive material 16 is completed, rotation of the polygon mirror 170 is stopped. The control section 186 then stops supplying electrical power to the D.C. motor 176, and energizes the electromagnet 182.

Due to the energizing of the D.C. motor 176 being stopped, the polygon mirror 170 rotates by inertial force and the rotational speed thereof gradually decreases until the polygon mirror 170 stops. The electromagnet 182 is energized to generate magnetic force, and attracts the disk 180 provided on the polygon mirror 170.

Accordingly, when the inertial force becomes lower than the magnetic force attracting the disk 180, the polygon mirror 170 stops rotating at the position at which the disk 180 opposes the electromagnet 182.

Therefore, the rotation of the polygon mirror 170 can be stopped at a particular position at which a desired reflecting surface 174 faces the desirable direction and the polygon mirror 170 (thus the desired reflecting surface 174) can be reliably maintained at the position, by disposing the disk 180 and the electromagnet 182 in a manner that the disk 180 and the electromagnet 182 halts the polygon mirror 170 at the particular position at which the desired reflecting surface 174 thereof faces the desirable direction.

Moreover, the light scanning apparatus 172 is structured such that the light beam emitted from the laser 52 irradiates the SOS sensor 184 when the polygon mirror 170 stops. When the control section 186 stops energizing the D.C. motor 176, the control section 186 measures the light amount of the light beam reflected by the reflecting surface 174 of the polygon mirror 170 by using the SOS sensor 184 once the polygon mirror 170 stops rotating.

Accordingly, if the light amount detected by the SOS sensor 184 is lower than a certain amount $S_0$, it can be judged that dirt has adhered to the reflecting surface 174 of the polygon mirror 170. The reflecting surface 174 may then be cleaned so as to avoid the carrying out of exposure processing of the photosensitive material 16 in a state in which the reflectance of the reflecting surface 174 is poor. Thus, the photosensitive material 16 can always be exposed at an appropriate light amount so as to obtain a finished image of high quality.

Moreover, in the light scanning apparatus 172, the polygon mirror 170 is stopped at the position at which the light beam reflected by the reflecting surface 174 thereof irradiated onto the SOS sensor 184. Thus, focus adjustment or light amount adjustment of the light beam can be carried out by using the SOS sensor 184. Accordingly, light amount adjustment or focus adjustment at the time of assembling the light scanning apparatus 172 can be performed easily in a short time, and a light scanning apparatus of high accuracy can be manufactured at a low cost.

FIFTH EMBODIMENT

A fifth embodiment of the present invention will be described hereinafter. Since the basic structure of the fifth embodiment is the same as that of the above-described fourth embodiment, the same reference numerals are used to designate elements which are the same as those of the fourth embodiment and detailed description thereof will be omitted.

In FIG. 10, main portions of a light scanning apparatus 200 according to the present fifth embodiment are shown.

The light scanning apparatus 200 is provided with a brake mechanism 204 for a rotation shaft 202 which rotates integrally with the motor rotation shaft 178 and the polygon mirror 170. The brake mechanism 204 is merely one example of the stopping means and the holding means. The structures of the stopping means and the holding means are not to be limited thereto.

The brake mechanism 204 is provided with a pair of elongated plates 206, 208. Intermediate portions of the plates 206, 208 are curved into circular arc shaped, forming curved portions 206A, 208A. The inner diameter of these curved portions 206A, 208A is slightly greater than the outer diameter of the rotation shaft 202. The plates 206, 208 are disposed such that the curved portions 206A, 208A surround the rotation shaft 202. Ones of end portions of the plates 206, 208 are connected together by, for example, a pin 210 such that the angle therebetween can be changed.

The other end of the one batten plate 206 is connected to a bracket 214 on which a solenoid 212 is mounted, and the other end of the other batten plate 208 is connected to the distal end of a rod 212A of the solenoid 212. Moreover, brake shoes 216 are mounted to the inner surfaces of the curved portions 206A, 208A of the plates 206, 208.

Accordingly, in a state in which the rod 212A of the solenoid 212 protrudes, the brake shoes 216 are moved away from the peripheral surface of the rotation shaft 202 such that the rotation shaft 202 can rotate freely. By contracting the rod 212A of the solenoid 212, the plates 206, 208 approach each other such that the brake shoes 216 abut against the peripheral surface of the rotation shaft 202 and sandwich the rotation shaft 202. In this way, the rotation of the rotation shaft 202 and the polygon mirror 170 is stopped.

The solenoid 212 is connected to the control section 186, and the operation of the brake mechanism 204 is controlled by the control section 186.

Moreover, the rotary encoder 160 is mounted to the D.C. motor 176. The rotary encoder 160 is connected to the control section 186 so that the control section 186 detects the rotation angle of the polygon mirror 170 by the rotary encoder 160.

When the control section 186 stops the supply of electrical power to the D.C. motor 176 and the rotation of the polygon mirror 170 is stopped, the control section 186 operates the brake mechanism 204 on the basis of the rotation angle of the polygon mirror 170 detected by the rotary encoder 160.

At this time, the control section 186 operates the D.C. motor 176 by turning it on and off as shown in FIG. 11. That is, when a preset time $T_0$ has passed after the D.C. motor 176 is turned off, the control section 186 supplies electrical power to the D.C. motor 176 for the time lengths $T_{ON}$ which are spaced apart by time lengths $T_{OFF}$ during which electrical power is not supplied to the D.C. motor 176. The time length $T_0$ is set to be the length of time until the polygon mirror 170, which is rotating by inertial force, substantially stops rotating. However, the time length $T_0$ can be shortened by stopping or slowing down the rotation of the polygon mirror 170 by operating the brake mechanism 204. Moreover, instead of the time length $T_0$, the change in the rotation angle detected by the rotary encoder 160 can be used to judge the stopping of the rotation of the polygon mirror 170.

Due to the D.C. motor 176 being supplied with electrical power intermittently, the motor rotation shaft 178 of the D.C. motor 176 and thus the polygon mirror 170 are rotated inchingly (in small increments). When the polygon mirror 170 which is being rotated inchingly arrives at a certain angle of rotation, the brake mechanism 204 is operated such that driving of the D.C. motor 176 is stopped, and the motor rotation shaft 178 and thus the polygon mirror 170 are maintained at this stopped position.

A cleaning mechanism 218 (see FIG. 10) is provided in the light scanning apparatus 200. The cleaning mechanism 218 includes a blower nozzle 220 facing the polygon mirror 170.

The rotation angles at which the respective reflecting surface 174 of the polygon mirror 170 oppose the blower nozzle 220 are stored in the control section 186. Thus, the polygon mirror 170 can be stopped at a position at which any one of its reflecting surfaces 174 faces the blower nozzle 220.

The cleaning mechanism 218 cleans the reflecting surface 174 of the polygon mirror 170 by the blower nozzle 220 jetting air to blow off dust, dirt, or the like adhering to the reflecting surface 174, when the reflecting surface 174 faces the blower nozzle 220.

In the light scanning apparatus 220 structured in this way, any one of the reflecting surfaces 174 of the polygon mirror 170 can be stopped at a position facing a desired direction. Accordingly, by operating the brake mechanism 204 at the stopping position, the polygon mirror 170 can be maintained in the stopping position.

Therefore, when the light beam reflectance has deteriorated due to the dirt adhering to the reflecting surface 174 of the polygon mirror 170, the light scanning apparatus 200 cleans the reflecting surface 174 by causing the six reflecting surfaces 174 to face the blower nozzle 220 one after another to be cleaned by the air jetted therefrom.

In this way, automatic cleaning of the reflecting surface 174 using the cleaning mechanism 218 is made possible since the light scanning apparatus 200 enables the polygon mirror 170 to be stopped at a position at which the reflecting surface 174 thereof faces a preset direction and enables the polygon mirror 170 to be maintained at this stopped position.

For the cleaning means for the reflecting surface 174, various mechanisms can be used in place of the cleaning mechanism 218. Modified examples of the cleaning mechanism 218 of the present fifth embodiment will be described hereinafter.

In FIG. 12, a cleaning mechanism 224 using a cleaning roller 222 which wipes dirt off the reflecting surface 174 while rotating is illustrated as such a modified example. In the cleaning mechanism 224, the cleaning roller 222 is provided on a bracket 226 such that the axis thereof is parallel to the axis of the rotation shaft 202 of the polygon mirror 170. Moreover, a motor 228 is mounted to the bracket 226, and the cleaning roller 222 is rotated and driven due to the driving of the motor 228.

A slider 230 is mounted to the bracket 226 such that the slider 230 slidably engages with a guide rail 232. The guide rail 232 is provided such that the longitudinal direction thereof is perpendicular to the axis of the rotation shaft 202 of the polygon mirror 170. The polygon mirror 170 is stopped at the position at which the reflecting surface 174 to be cleaned is parallel to the guide rail 232. Moreover, the guide rail 232 is provided so as to be spaced apart by a certain distance from the reflecting surface 174 opposing the cleaning mechanism 224.

By sliding the cleaning roller 222 along the guide rail 232, the peripheral surface of the cleaning roller 222 rubs the surface of the reflecting surface 174.

Moreover, an endless driving belt 234 is connected to the bracket 226. This driving belt 234 is trained around a pair of pulleys 236, 238. Furthermore, the pulleys 236, 238 are located such that the portion of the driving belt 234 between the pulleys 236 and 238 is parallel to the guide rail 232.

The pulley 236 is connected to the driving shaft of a motor 240, so that the driving belt 234 moves between the pulleys 236 and 238 when the motor 240 is driven. Moreover, as the driving belt 234 moves between the pulleys 236 and 238, the bracket 226 along with the cleaning roller 222 slides along the guide rail 232.

The motor 228 and the motor 240 are connected to the control section 186, so that the operation of these two motors is controlled by the control section 186. Moreover, the cleaning roller 222 is slid to one end of the guide rail 232, as indicated by the two-dot chain line in FIG. 12 when the cleaning roller 222 is not used for cleaning, to avoid interfering with the polygon mirror 170.

The control section 186 stops the polygon mirror 170 at the position at which any of the reflecting surfaces 174 faces the cleaning mechanism 224, and then rotates the cleaning roller 222 by driving the motor 228. At the same time, the control section 186 drives the motor 240. Accordingly, the cleaning roller 222 moves along the reflecting surface 174 of the polygon mirror 170 while rotating, so as to rub the reflecting surface 174 to remove dirt adhered thereto.

Moreover, the control section 186 drives the motor 240 in the reverse direction when the cleaning roller 222 reaches the other end of the guide rail 232. In this way, the peripheral surface of the cleaning roller 222 again rubs the reflecting surface 174 of the polygon mirror 170 while the cleaning roller 222 is returning to its withdrawn position. Upon returning, the cleaning roller 222 may be rotated in the reverse direction.

While the cleaning roller 222 is used in FIG. 12, a blade may be used in place of the cleaning roller 222.

In FIG. 13, a cleaning mechanism 244 using a cleaning belt 242 is illustrated as another modified example. In this cleaning mechanism 244, a roll 248 formed by winding the cleaning belt 242 around a shaft 246 in layers, and a winding shaft 250 for taking-up the cleaning belt 242 pulled out from the roll 248 are provided at certain positions such that the axes thereof are parallel to the axis of the rotation shaft 202 of the polygon mirror 170. Moreover, the winding shaft 250 is connected to a motor driving shaft 254 of a winding motor 252, and the winding shaft 250 is rotatingly driven in the direction of winding up the cleaning belt 242 (the direction indicated by arrow G) by the driving of the winding motor 252.

A pair of back-up rollers 256 are provided between the roll 248 and the winding shaft 250 so as to oppose the reflecting surface 174 to be cleaned of the polygon mirror 170. The back-up rollers 256 are axially supported at a substantially U-shaped bracket 258 such that each of the back up rollers 256 faces a corresponding edge portion of the reflecting surface 174.

The distal end of a rod 262 of a solenoid 260 is connected to the intermediate portion of this bracket 258, so that when the solenoid 260 extends the rod 262, the pair of back-up rollers 256 are moved toward the polygon mirror 170 from the withdrawn position indicated by the two-dot chain line in FIG. 13.

Accordingly, the back-up rollers 256 cause a portion of the cleaning belt 242 between the roll 248 and the winding shaft 250 to be pressed against the reflecting surface 174 of the polygon mirror 170.

The winding motor 252 and the solenoid 260 are connected to the control section 186, so that their operation is controlled by the control section 186.

The control section 186 stops the polygon mirror 170 at a position at which any of the reflecting surfaces 174 thereof faces the cleaning mechanism 244, and then operates the solenoid 260 to extend the rod 261. This causes the pair of the back-up rollers 256 to be moved from their withdrawn position toward the polygon mirror 170, thereby covering the reflecting surface 174 by a portion of the cleaning belt 242 between the two back-up rollers 256. By driving the winding motor 252 in this state, the cleaning belt 242 is pulled out from the roll 248, and rubs and cleans the surface of the reflecting surface 174 as the belt 242 is taken-up around the winding shaft 250.

In addition to the winding shaft 250, a winding motor can be mounted to the roll 248 so that the cleaning operation can be performed even when the cleaning belt 242 wound on the winding shaft 250 is taken-up onto the shaft 246 of the roll 248.

In this way, the reflecting surface 174 of the polygon mirror 170 can be cleaned automatically by using cleaning mechanisms of various structures by stopping the polygon mirror 170 at the position at which the reflecting surface 174 thereof faces a certain direction. That is, automatic cleaning of the reflecting surface 174 can be realized by enabling the polygon mirror 170 to stop such that the reflecting surface 174 thereof faces a certain direction.

The spinner 58 with one reflecting surface and the polygon mirror 170 on which plural reflecting surfaces 174 are formed are used in the above-described embodiments as the rotating reflector. However, a galvanometer can also be used. That is, the present invention can be applied to a light scanning apparatus of any structure which scans and exposes a recording medium such as the photosensitive material 16 by reflecting and deflecting a light beam by using a reflecting surface.

Moreover, in the above-described fourth and fifth embodiments, a scattered light sensor can be provided in the same way as in the first to third embodiments. That is, by providing the scattered light sensor 99 adjacent to the light amount sensor 98, it is possible to clean the reflecting surface 174 only when the amount of dust adhering to the reflecting surface 174 exceeds a certain amount and the reflectance of the reflecting surface 174 becomes a certain value or less.

In accordance with the present invention described above, by providing control means, the rotation of a rotating reflector can be stopped in a state in which a reflecting surface formed on the rotating reflector faces a predetermined direction.

Moreover, since the present invention enables the rotation of the rotating reflector to be stopped in a position at which the reflecting surface thereof faces a predetermined direction, the structure of the apparatus is not complex and thus the manufacturing costs thereof can be kept down. Furthermore, since a light beam can be detected in the state in which the rotation of the rotating reflector is stopped, the accuracy of detecting the light beam does not deteriorate, and operations such as adjustment of the light amount of the light beam and the like are facilitated.

What is claimed is:

1. A light scanning apparatus comprising:
   a rotating reflector having at least one reflecting surface rotated around a rotation axis, said rotating reflector reflecting and deflecting an incident light beam by said at least one reflecting surface; and
   control means for controlling a stopping position of said rotating reflector so that said rotating reflector stops rotating in a state in which one reflecting surface of said at least one reflecting surface faces a certain direction, said control means comprising:
      a first magnetic body disposed inside said rotating reflector and rotated integrally with said rotating reflector; and
      a second magnetic body provided on a locus of rotation of said first magnetic body and in a state of non-contact with said rotating reflector, said second magnetic body and said first magnetic body generating attraction therebetween at least when said rotating reflector stops rotating,
   wherein said light scanning apparatus scans an exposure surface of a recording medium by the light beam reflected from said at least one reflecting surface of said rotating reflector.

2. A light scanning apparatus according to claim 1, further comprising holding means for preventing rotation of said rotating reflector which is stopped by said control means in the state in which said at least one reflecting surface faces the certain direction, and for holding said rotating reflector in the stopped position.

3. A light scanning apparatus according to claim 1, further comprising cleaning means for cleaning said reflecting surface, said cleaning means being provided so as to oppose said rotating reflector which has been stopped by said control means in the state in which said reflecting surface faces a certain direction.

4. A light scanning apparatus according to claim 3, further comprising detecting means for detecting the light beam reflected by said reflecting surface of said rotating reflector which has been stopped by said control means in the state in which said reflecting surface faces the certain direction, wherein said cleaning means is operated on the basis of results of detection by said detecting means.

5. A light scanning apparatus comprising:
- a rotating reflector having at least one reflecting surface rotated around a rotation axis, said rotating reflector reflecting and deflecting an incident light beam by said at least one reflecting surface; and
- control means for controlling a stopping position of said rotating reflector so that said rotating reflector stops rotating in a state in which one reflecting surface of said at least one reflecting surface faces a certain direction, wherein said control means comprises:
  - a permanent magnet provided inside said rotating reflector along a direction perpendicular to the axis of said rotating reflector, one end of said permanent magnet being a north pole and the other end a south pole; and
  - a magnet disposed in the vicinity of and in a non-contact relationship with said permanent magnet, said magnet having a south pole and a north pole disposed so as to cause said permanent magnet to stop in the state in which said reflecting surface faces the certain direction when said rotating reflector is stopped, wherein said light scanning apparatus scans an exposure surface of a recording medium by the light beam reflected from said at least one reflecting surface of said rotating reflector.

* * * * *